(12) United States Patent
Strohmann et al.

(10) Patent No.: US 10,515,255 B2
(45) Date of Patent: Dec. 24, 2019

(54) FINGERPRINT SENSOR WITH BIOIMPEDANCE INDICATOR

(71) Applicant: QUALCOMM Incorporated, San Diego, CA (US)

(72) Inventors: Jessica Liu Strohmann, Cupertino, CA (US); Yair Karmi, San Diego, CA (US); Yipeng Lu, Davis, CA (US); Hrishikesh Vijaykumar Panchawagh, Cupertino, CA (US); David William Burns, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/469,326

(22) Filed: Mar. 24, 2017

(65) Prior Publication Data
US 2018/0276443 A1 Sep. 27, 2018

(51) Int. Cl.
*G06K 9/00* (2006.01)
(52) U.S. Cl.
CPC ......... *G06K 9/0012* (2013.01); *G06K 9/0002* (2013.01)
(58) Field of Classification Search
CPC .............. G06K 9/0002; G06K 9/0012; G06K 9/00087; G06K 9/00013; G06K 9/0004; G06K 9/00107; G06K 9/00899; G06K 9/6293
See application file for complete search history.

(56) References Cited

U.S. PATENT DOCUMENTS

| | | |
|---|---|---|
| 6,795,569 B1 | 9/2004 | Setlak |
| 7,853,055 B2 | 12/2010 | Machida |
| 8,335,356 B2 * | 12/2012 | Schmitt ................ G06K 9/0002 382/115 |
| 8,358,815 B2 | 1/2013 | Benkley et al. |
| 8,482,381 B2 | 7/2013 | Chatterjee et al. |
| 9,104,898 B2 | 8/2015 | Case |
| 9,390,308 B2 | 7/2016 | Makowski et al. |
| 9,953,205 B1 | 4/2018 | Rasmussen et al. |

(Continued)

OTHER PUBLICATIONS

U.S. Office Action dated Aug. 2, 2018, in U.S. Appl. No. 15/469,313.
(Continued)

*Primary Examiner* — Bhavesh M Mehta
*Assistant Examiner* — Ian L Lemieux
(74) *Attorney, Agent, or Firm* — Weaver Austin Villeneuve & Sampson LLP

(57) ABSTRACT

An apparatus may include an ultrasonic sensor system, a platen, a set of bioimpedance electrodes proximate the platen and a control system configured for communication with the ultrasonic sensor system and the set of bioimpedance electrodes. The control system may be further configured for controlling the ultrasonic sensor system to transmit ultrasonic waves, receiving ultrasonic sensor signals from the ultrasonic sensor system corresponding to ultrasonic waves reflected from a portion of a body in contact with the platen, receiving bioimpedance measurements from the set of bioimpedance electrodes and estimating a status of one or more biometric indicators of the portion of the body based on the ultrasonic sensor signals and the bioimpedance measurements.

27 Claims, 25 Drawing Sheets

(56) References Cited

U.S. PATENT DOCUMENTS

| | | | |
|---|---|---|---|
| 2005/0180620 A1* | 8/2005 | Takiguchi | G06K 9/00013 |
| | | | 382/128 |
| 2008/0166028 A1 | 7/2008 | Turek et al. | |
| 2008/0247615 A1 | 10/2008 | Mainguet | |
| 2010/0066697 A1 | 3/2010 | Jacomet et al. | |
| 2010/0067747 A1* | 3/2010 | Perruchot | G06K 9/0002 |
| | | | 382/115 |
| 2010/0113952 A1* | 5/2010 | Raguin | G06K 9/0012 |
| | | | 600/509 |
| 2012/0237091 A1 | 9/2012 | Nakamura | |
| 2013/0100021 A1 | 4/2013 | Larsen et al. | |
| 2014/0219521 A1* | 8/2014 | Schmitt | G06K 9/0002 |
| | | | 382/124 |
| 2014/0354597 A1 | 12/2014 | Kitchens et al. | |
| 2014/0359757 A1 | 12/2014 | Sezan et al. | |
| 2015/0003693 A1 | 1/2015 | Baca et al. | |
| 2015/0123931 A1 | 5/2015 | Kitchens et al. | |
| 2015/0126246 A1 | 5/2015 | Lombardi et al. | |
| 2016/0070967 A1* | 3/2016 | Du | G06K 9/00093 |
| | | | 382/124 |
| 2016/0239704 A1 | 8/2016 | Yamada et al. | |
| 2016/0246396 A1* | 8/2016 | Dickinson | G06F 3/03545 |
| 2016/0253544 A1 | 9/2016 | Weber et al. | |
| 2016/0342781 A1* | 11/2016 | Jeon | G06F 21/32 |
| 2017/0231534 A1 | 8/2017 | Agassy et al. | |
| 2017/0255338 A1* | 9/2017 | Medina | G06F 3/0416 |
| 2017/0323130 A1* | 11/2017 | Dickinson | A61B 8/02 |
| 2017/0372122 A1 | 12/2017 | Shim et al. | |
| 2018/0018495 A1* | 1/2018 | Hung | G06K 9/0004 |
| 2018/0101711 A1* | 4/2018 | D'Souza | G06F 21/32 |
| 2018/0276439 A1 | 9/2018 | Strohmann et al. | |
| 2018/0276440 A1 | 9/2018 | Strohmann et al. | |

OTHER PUBLICATIONS

U.S. Office Action dated Aug. 31, 2018, in U.S. Appl. No. 15/469,290.
U.S. Office Action dated Jan. 4, 2019, in U.S. Appl. No. 15/469,313.
U.S. Office Action dated Feb. 11, 2019, in U.S. Appl. No. 15/469,290.
U.S. Notice of Allowance dated May 29, 2019, in U.S. Appl. No. 15/469,313.
U.S. Notice of Allowance dated May 29, 2019, in U.S. Appl. No. 15/469,290.

* cited by examiner

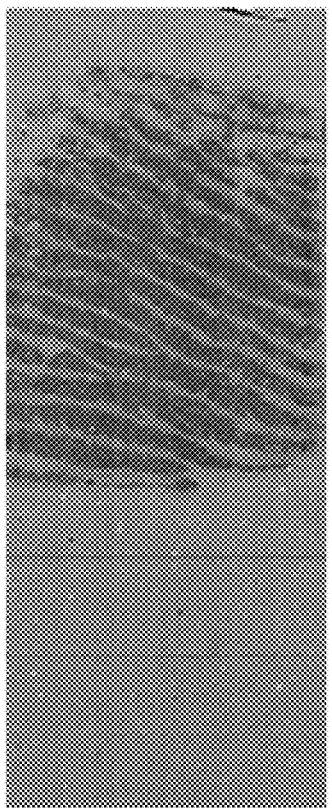 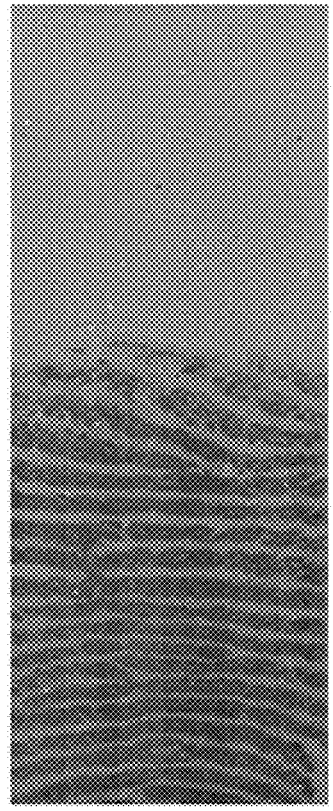
*Figure 7A*　　　　　　　　　　　*Figure 7B*

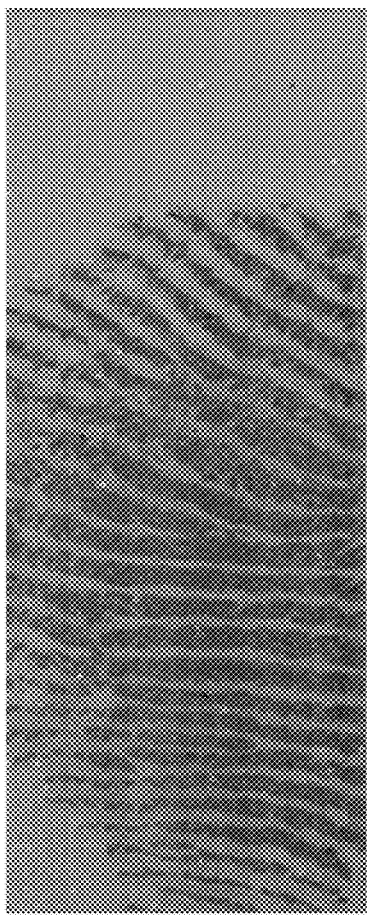 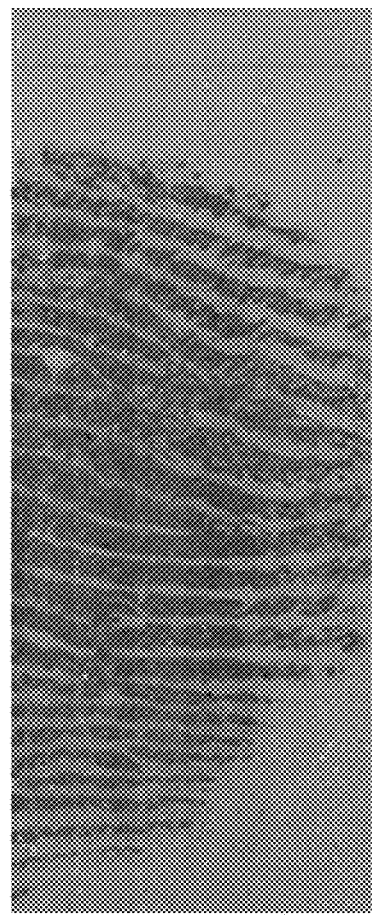
Figure 9A                    Figure 9B

FINGERPRINT SENSOR WITH BIOIMPEDANCE INDICATOR

TECHNICAL FIELD

This disclosure relates generally to ultrasonic sensor systems and methods for using such systems.

DESCRIPTION OF THE RELATED TECHNOLOGY

Ultrasonic fingerprint sensors have been included in devices such as smartphones, cash machines and cars to authenticate a user. A typical ultrasonic fingerprint sensor has a single function of capturing fingerprint images for user authentication. In order to provide other functions, additional sensors are generally needed, which increases the cost and complexity of such systems.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic sensor system and a control system that is configured for communication with the ultrasonic sensor system. In some examples, at least a portion of the control system may be coupled to the ultrasonic sensor system. In some implementations, a mobile device may be, or may include, the apparatus. For example, a mobile device may include an apparatus as disclosed herein. In some examples, the apparatus may include a platen.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for controlling the ultrasonic sensor system to transmit ultrasonic waves and for receiving signals from the ultrasonic sensor system corresponding to ultrasonic waves reflected from a finger positioned on the platen. In some examples, the control system may be configured for obtaining fingerprint image data corresponding to the signals and for determining a change in a force, or a result from the change in a force, of at least a portion of the finger on the platen corresponding to the signals.

In some implementations, the control system may be configured for determining the change in the force according to detected changes in contact areas of fingerprint ridges on the platen. According to some examples, wherein the control system may be configured for determining the change in the force according to indications of acoustic impedance changes. The indications of acoustic impedance changes may, for example, include changes in reflection amplitudes in fingerprint ridge areas. In some instances, the indications of increased acoustic impedance in fingerprint ridge areas may include decreased reflection amplitudes corresponding with the fingerprint ridge areas. In some examples, the indications of acoustic impedance changes may be based, at least in part, on signals R1 corresponding to reflections from a platen/fingerprint ridge interface and on signals R2 corresponding to reflections from a platen/fingerprint valley interface. In some instances, the indications of acoustic impedance changes may correspond to at least one of a change in a difference between R1 and R2, or a change in a sum of R1 and R2.

According to some examples, the control system may be configured for determining a finger action according to a detected finger force direction, detected changes of an overall finger force, and/or a detected rate of finger force change. The finger action may, in some instances, include one or more low-force touches, an increasing finger touch force, a finger tilt, a finger rotation, and/or a series of alternating low-force and high-force finger touches. In some implementations, the control system may be configured for controlling the apparatus based, at least in part, on a determined finger action. In some examples, the control system may be configured for providing at least one of mouse functionality or joystick functionality for controlling the apparatus based, at least in part, on a detected finger force direction. According to some examples, the finger force direction may be detected according to changes in fingerprint ridge patterns corresponding with a shear stress of fingerprint ridges in contact with the platen.

According to some implementations, the control system may be configured for estimating changes in finger temperature based, at least on part, on the signals. In some examples, the control system may be configured for detecting changes in finger hydration status or a skin condition corresponding to the signals. According to some such examples, the control system may be configured for detecting changes in finger hydration status over a period of time. The changes in finger hydration status may, in some examples, correspond with multiple instances of receiving signals from the ultrasonic sensor system.

Some or all of the operations, functions and/or methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. According to some examples, the method may correspond to control system functionality that is disclosed herein.

In some examples, the method may involve controlling an ultrasonic sensor system to transmit ultrasonic waves and receiving signals from the ultrasonic sensor system corresponding to ultrasonic waves reflected from a finger positioned on a platen. In some such examples, the method may involve obtaining fingerprint image data corresponding to the signals and determining a change in a force, or a result from the change in a force, of at least a portion of the finger on the platen corresponding to the signals.

According to some implementations, the software may include instructions for determining the change in the force according to detected changes in contact areas of fingerprint ridges on the platen. In some implementations, the software may include instructions for determining the change in the force according to indications of acoustic impedance changes. In some examples, the software may include instructions for determining the change in the force according to indications of acoustic impedance changes. According to some examples, the indications of acoustic impedance changes include indications of increased acoustic impedance in fingerprint ridge areas. The indications of increased acoustic impedance in fingerprint ridge areas may include decreased reflection amplitudes corresponding with the fingerprint ridge areas. In some examples, the indications of acoustic impedance changes are based, at least in part, on signals R1 corresponding to reflections from a platen/fingerprint ridge interface and on signals R2 corresponding to reflections from a platen/fingerprint valley interface.

In some implementations, the software may include instructions for determining a finger action and for controlling an apparatus based, at least in part, on a determined finger action. In some examples, the software may include instructions for providing at least one of mouse functionality or joystick functionality for controlling the apparatus based, at least in part, on a detected finger force direction. According to some examples, the software may include instructions for estimating changes in finger temperature based, at least in part, on the signals. In some examples, the software may include instructions for detecting changes in finger hydration status over a period of time. The changes in finger hydration status may, for example, correspond with multiple instances of receiving signals from the ultrasonic sensor system.

Some innovative aspects of the subject matter described in this disclosure may be implemented in a method. The method may involve controlling an ultrasonic sensor system to transmit ultrasonic waves and receiving signals from the ultrasonic sensor system corresponding to ultrasonic waves reflected from a finger positioned on a platen. In some instances, the method may involve obtaining fingerprint image data corresponding to the signals and determining a change in a force, or a result from the change in a force, of at least a portion of the finger on the platen corresponding to the signals. In some implementations, the method may involve determining the change in the force according to detected changes in contact areas of fingerprint ridges on the platen.

Some innovative aspects of the subject matter described in this disclosure may be implemented in a mobile device. In some examples, the mobile device may include a first fingerprint sensor residing on a first side of the mobile device. In some implementations, the first fingerprint sensor may include a platen. According to some examples, the first fingerprint sensor may be, or may include, an ultrasonic fingerprint sensor. However, in alternative implementations the first fingerprint sensor may not include an ultrasonic fingerprint sensor. For example, the first fingerprint sensor may include a capacitive fingerprint sensor, an optical fingerprint sensor, a thermal fingerprint sensor, a radio frequency fingerprint sensor, etc.

The mobile device may include a display residing on a second side of the mobile device, the second side being opposite from the first side. According to some implementations, the mobile device may include a control system configured for communication with the first fingerprint sensor and the display. In some examples, the control system may be configured for receiving first fingerprint sensor signals from the first fingerprint sensor corresponding to a fingerprint contact area of a first finger positioned on the platen, for detecting one or more finger distortions corresponding to changes of the first fingerprint sensor signals and for controlling the mobile device based, at least in part, on the one or more finger distortions.

According to some examples, controlling the mobile device may include initiating a device wake-up process, authenticating a user, unlocking a device, selecting a menu item, starting an application, emulating a click or a double-click, moving a cursor or pointer, interacting with a browser application, detecting a swipe gesture, detecting a swirl gesture, operating a game, changing a brightness, changing a volume, consummating a transaction, initiating a call and/or operating a camera. In some examples, the control system may be configured for determining a navigational input corresponding with one or more finger distortions. Controlling the mobile device may involve controlling the display based, at least in part, on the navigational input.

In some implementations, the control system may be configured for detecting a change of the fingerprint contact area and for controlling the mobile device based, at least in part, on the detected change of the fingerprint contact area. For example, the control system may be configured for providing at least one of mouse functionality or joystick functionality for controlling the mobile device based, at least in part, on the one or more detected finger distortions or the detected change of the fingerprint contact area.

According to some implementations, the control system may be configured for detecting the one or more finger distortions according to detected changes in spacing between fingerprint features. For example, the detected changes in spacing include detected changes in one or more of ridge-to-ridge spacing, valley-to-valley spacing or ridge-to-valley spacing. In some examples, the changes in spacing may be detected in a peripheral region of the fingerprint contact area. According to some examples, the fingerprint features may include fingerprint minutiae and/or sweat pores. In some examples, the control system may be configured for detecting the one or more finger distortions according to detected changes in spacing between fingerprint features in a central region of the fingerprint contact area and fingerprint features in a peripheral region of the fingerprint contact area. In some implementations, the control system may be configured for interpreting a detected change in spacing between fingerprint features as corresponding to a direction of navigational input, a magnitude of navigational input, or both a direction and a magnitude of navigational input.

In some examples, the one or more finger distortions may correspond with non-sliding movements of the first finger while the first finger is in contact with the platen. However, in some instances the one or more finger distortions may correspond with sliding movements of the first finger while the first finger is in contact with the platen.

According to some examples, detecting one or more finger distortions may involve detecting a rotational movement of the first finger and the control system may be configured for controlling the mobile device based, at least in part, on the rotational movement. In some examples, detecting a rotational movement of the first finger may involve detecting a finger rotation direction and/or a finger rotation magnitude of the first finger. In some such examples, the control system may be configured for controlling the mobile device based, at least in part, on the finger rotation direction and/or the finger rotation magnitude.

In some implementations, the mobile device may include a second fingerprint sensor residing on the second side of the mobile device. The control system may be configured for communication with the second fingerprint sensor. According to some such implementations, the control system may be further configured for receiving second fingerprint sensor signals from the second fingerprint sensor corresponding to a second finger positioned on the second fingerprint sensor. In some examples, the control system may be further configured for detecting one or more finger distortions of the second finger corresponding to changes of the second fingerprint sensor signals and controlling the mobile device based, at least in part, on the one or more finger distortions of the second finger. In some instances, the first finger or the second finger may be a thumb. In some examples, the control system may be further configured for performing an authentication process that is based, at least in part, on the first fingerprint sensor signals and the second fingerprint sensor signals.

Innovative aspects of the subject matter described in this disclosure can be implemented in one or more non-transitory media having software stored thereon. In some examples, the software may include instructions for receiving first fingerprint sensor signals from a first fingerprint sensor residing on a first side of a mobile device. The mobile device may have a display residing on a second side of the mobile device. The second side may be opposite from the first side. The first fingerprint sensor may include a platen. The first fingerprint sensor signals may correspond to a fingerprint contact area of a first finger positioned on the platen. In some implementations, the software may include instructions for detecting one or more finger distortions corresponding to changes of the first fingerprint sensor signals and for controlling the mobile device based, at least in part, on the one or more finger distortions.

According to some examples, controlling the mobile device may involve a device wake-up process, authenticating a user, unlocking a device, selecting a menu item, starting an application, emulating a click or a double-click, moving a cursor or pointer, interacting with a browser application, detecting a swipe gesture, detecting a swirl gesture, operating a game, changing a brightness, changing a volume, consummating a transaction, initiating a call and/or operating a camera.

In some implementations, the software may include instructions for determining a navigational input corresponding with one or more finger distortions. In some such implementations, controlling the mobile device may involve controlling the display based, at least in part, on the navigational input.

According to some examples, the software may include instructions for detecting the one or more finger distortions according to detected changes in spacing between fingerprint features. In some implementations, detecting one or more finger distortions may involve detecting a rotational movement of the first finger. In some such implementations, the software may include instructions for controlling the mobile device based, at least in part, on the rotational movement.

According to some implementations, the software may include instructions for receiving second fingerprint sensor signals from a second fingerprint sensor residing on a second side of the mobile device. The second fingerprint sensor signals may correspond to a second finger positioned on the second fingerprint sensor. In some implementations, the software may include instructions for performing an authentication process that is based, at least in part, on the first fingerprint sensor signals and the second fingerprint sensor signals.

Some innovative aspects of the subject matter described in this disclosure may be implemented in a method of controlling a mobile device. The method may involve receiving first fingerprint sensor signals from a first fingerprint sensor residing on a first side of the mobile device. The mobile device may have a display residing on a second side of the mobile device. The second side may be opposite from the first side. The first fingerprint sensor may include a platen. The first fingerprint sensor signals may correspond to a fingerprint contact area of a first finger positioned on the platen. In some implementations, the method may involve detecting one or more finger distortions corresponding to changes of the first fingerprint sensor signals and controlling the mobile device based, at least in part, on the one or more finger distortions. In some examples, the method may involve determining a navigational input corresponding with one or more finger distortions. Controlling the mobile device may involve controlling the display based, at least in part, on the navigational input.

Other innovative aspects of the subject matter described in this disclosure may be implemented in an apparatus. The apparatus may include an ultrasonic sensor system, a set of bioimpedance electrodes and a control system that is configured for communication with the ultrasonic sensor system and the set of bioimpedance electrodes. In some examples, at least a portion of the control system may be coupled to the ultrasonic sensor system and/or the set of bioimpedance electrodes. In some implementations, a mobile device may be, or may include, the apparatus. For example, a mobile device may include an apparatus as disclosed herein. In some examples, the apparatus may include a platen. In some such examples, the set of bioimpedance electrodes may reside proximate the platen.

In some examples, the control system may be configured for controlling the ultrasonic sensor system to transmit ultrasonic waves and for receiving ultrasonic sensor signals from the ultrasonic sensor system corresponding to ultrasonic waves reflected from a portion of a body in contact with the platen. In some such examples, the control system may be configured for receiving bioimpedance measurements from the set of bioimpedance electrodes and for estimating a status of one or more biometric indicators of the portion of the body based on the ultrasonic sensor signals and the bioimpedance measurements.

According to some implementations, the control system may be configured for determining changes in at least one of capacitance or resistance of the portion of the body according to changes of the bioimpedance measurements. In some examples, the one or more biometric indicators may include skin hydration level, skin oiliness level, skin dryness and/or skin elasticity. In some implementations, the control system may be configured to modify one or more of the bioimpedance measurements according to the ultrasonic sensor signals.

According to some examples, the bioimpedance electrodes may include capacitive sense electrodes. In some such examples, the capacitive sense electrodes may include interdigitated capacitive sense electrodes. In some implementations, the control system may be configured for activating a first subset of the capacitive sense electrodes with one or more sensor excitation frequencies and for receiving an electrical response from a second subset of the capacitive sense electrodes. The electrical response may, for example, include an output signal amplitude, a phase delay, or both an output signal amplitude and a phase delay. According to some implementations, estimating the status of the one or more biometric indicators may involve determining an effective dielectric permittivity of the portion of the body and comparing the effective dielectric permittivity with a reference dielectric permittivity. In some examples, the control system may be configured for activating the first subset of the capacitive sense electrodes with a plurality of sensor excitation frequencies and for determining a plurality of effective dielectric permittivities of the portion of the body. Each of the plurality of effective dielectric permittivities may correspond to a sensor excitation frequency of the plurality of sensor excitation frequencies. In some such examples, the control system may be configured for comparing the effective dielectric permittivities with reference dielectric permittivities.

In some implementations, the control system may be configured for calculating, based on the ultrasonic sensor signals, one or more acoustic impedance values for the portion of the body. In some such implementations, the control system may be configured for estimating the status of the one or more biometric indicators based on the one or more acoustic impedance values and the bioimpedance measurements. In some examples, the control system may be configured for calculating a composite measurement based on the one or more acoustic impedance values and the bioimpedance measurements, and for determining a skin condition of the portion of the body based, at least in part, on the composite measurement.

In some examples, the apparatus may include a substrate. According to some such examples, the set of bioimpedance electrodes may reside on the substrate. According to some examples, ultrasonic sensors of the ultrasonic sensor system also may reside on the substrate.

In some instances, the portion of the body may be a finger. According to some such examples, the control system may be configured to determine, based on the ultrasonic sensor signals, a fingerprint contact area. In some such examples, estimating the status of one or more biometric indicators may be based, at least in part, on the fingerprint contact area. According to some examples, the apparatus may include a user interface system. The control system may be configured to provide feedback, via the user interface system, regarding the fingerprint contact area.

According to some implementations, the control system may be configured for determining a liveness indicator based, at least in part, on the bioimpedance measurements. In some such implementations, the control system may be configured for performing an authentication process based, at least in part, on the ultrasonic sensor signals and the liveness indicator.

In some examples, the authentication process may also be based on a biometric indicator. The control system may be configured for generating the biometric indicator from the bioimpedance measurements. In some such implementations, the authentication process may involve determining whether the biometric indicator is above a predetermined lower biometric threshold, determining whether the biometric indicator is below a predetermined upper biometric threshold, and/or determining whether the biometric indicator is within a predetermined biometric range.

According to some implementations, the authentication process may involve determining current fingerprint data based on the ultrasonic sensor signals, modifying the current fingerprint data according to the bioimpedance measurements, to produce modified current fingerprint data, and comparing the modified current fingerprint data with stored fingerprint data of an enrolled user. In some such implementations, modifying the current fingerprint data may involve a ridge-flow correction, a dry-finger correction, a wet-finger correction and/or an oily-finger correction.

In some implementations, the authentication process may involve determining current fingerprint data based on the ultrasonic sensor signals and adjusting a fingerprint matching process according to the bioimpedance measurements. In some such implementations, the authentication process may involve comparing, according to the adjusted fingerprint matching process, the current fingerprint data with stored fingerprint data of an enrolled user.

According to some examples, the control system may be configured for controlling the ultrasonic sensor system to obtain three-dimensional image data and for extracting acoustic information from the bioimpedance measurements. According to some such examples, the control system may be configured for modifying the three-dimensional image data according to the acoustic information.

Innovative aspects of the subject matter described in this disclosure may be implemented in a method. The method may involve controlling an ultrasonic sensor system to transmit ultrasonic waves and receiving ultrasonic sensor signals from the ultrasonic sensor system corresponding to ultrasonic waves reflected from a portion of a body. In some implementations, the method may involve receiving bioimpedance measurements from a set of bioimpedance electrodes and estimating a status of one or more biometric indicators of the portion of the body based on the ultrasonic sensor signals and the bioimpedance measurements. According to some examples, the one or more biometric indicators may include at least one biometric indicator selected from a list of biometric indicators consisting of skin hydration level, skin oiliness level, skin dryness and skin elasticity.

In some implementations, the bioimpedance electrodes may include capacitive sense electrodes. In some such implementations, the method may involve activating a first subset of the capacitive sense electrodes with one or more sensor excitation frequencies and receiving an electrical response from a second subset of the capacitive sense electrodes.

Innovative aspects of the subject matter described in this disclosure may be implemented in a non-transitory medium having software stored thereon. According to some examples, the software may include instructions for controlling an ultrasonic sensor system to transmit ultrasonic waves and for receiving ultrasonic sensor signals from the ultrasonic sensor system corresponding to ultrasonic waves reflected from a portion of a body. In some examples, the software may include instructions for receiving bioimpedance measurements from a set of bioimpedance electrodes and for estimating a status of one or more biometric indicators of the portion of the body based on the ultrasonic sensor signals and the bioimpedance measurements.

In some examples, the software may include instructions for determining a liveness indicator based, at least in part, on the bioimpedance measurements. In some such examples, the software may include instructions for performing an authentication process based, at least in part, on the ultrasonic sensor signals and the liveness indicator.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIGS. 7A and 7B are images that represent fingerprint image data corresponding to upwards and downwards finger forces, respectively.

FIGS. 9A and 9B are images that represent fingerprint image data corresponding to lateral (e.g., left- and right-directed) finger forces.

DETAILED DESCRIPTION

Figure 1:
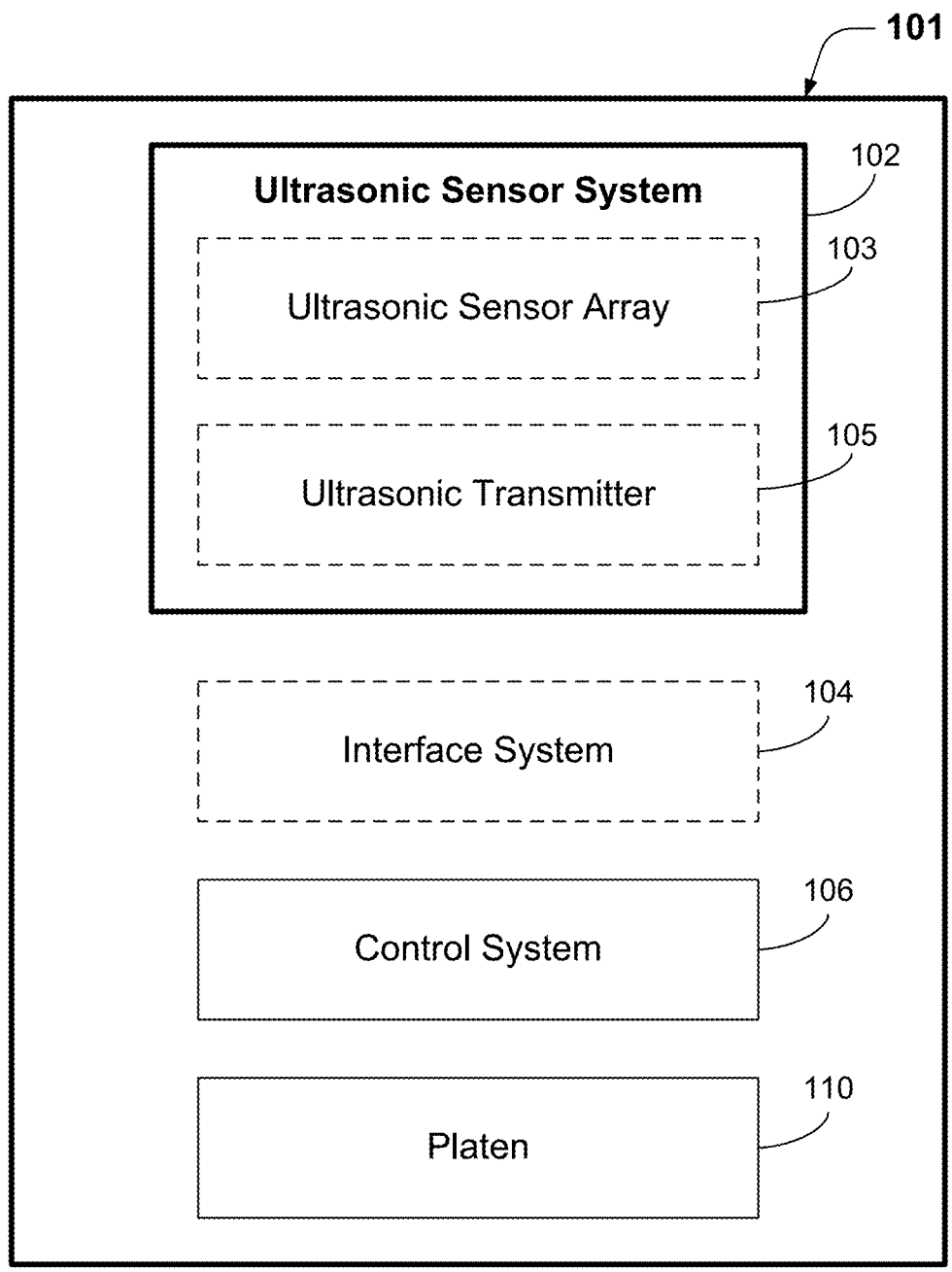
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

In some implementations, an apparatus may include a multi-functional ultrasonic sensor system and a control system configured not only for fingerprint sensing, but also for detecting changes in position or force (such as changes in normal force or shear force), e.g., when a finger is pushed, pressed or slid against a platen or another surface. In some implementations, the control system may be capable of determining a position or a change in position of a finger on a platen by determining the position or change in position of one or more fingerprint features (e.g., keypoints or fingerprint minutiae) of the finger with respect to the platen. In some examples, the position or change in position of the finger may be determined by determining the position of one or more fingerprint features with respect to the edge of the fingerprint region that is in contact with the platen as the finger is pressed or slid against the platen. In some implementations, the control system may be capable of determining changes in force according to detected changes in contact area of one or more fingerprint ridges on the platen. In some examples, changes in force may be determined by comparing the contacted area of fingerprint ridges on the platen to the non-contacted area of fingerprint valleys between the ridges within the fingerprint region, such as by calculating a ratio of ridge area to the total area of the fingerprint region, a ratio of valley area to the total area of the fingerprint region, or a ratio of ridge area to valley area in the fingerprint region. According to some examples, the control system may be capable of determining changes in force according to indications of acoustic impedance changes, such as indications of increased or decreased acoustic impedance in fingerprint ridge areas. Indications of increased or decreased acoustic impedances in the fingerprint ridge areas may be determined from measurements of the amplitude of the reflected ultrasonic wave from the platen surface by the ultrasonic sensor array. According to some implementations, the control system may be configured to detect changes in a normal force or a shear force distribution of a finger pressing and/or sliding against a platen surface by detecting localized changes in one or more ridge-to-ridge spacings due to finger pressure or a finger sliding on the platen surface, particularly near the edges of the fingerprint region, and/or the difference in acoustic impedance in the fingerprint ridge areas. Shear forces in the fingerprint region may be created or changed with or without a finger actually sliding along the platen surface. For example, shear forces may cause an increase in a ridge-to-ridge spacing near the leading edge of the fingerprint region and/or a decrease in a ridge-to-ridge spacing near the trailing edge of the fingerprint region.

According to some implementations, the control system may be configured for determining a finger action according to a detected position, change in a position, rate of change of a position, and/or direction of change of the position of a finger on the platen. According to some implementations, the control system may be configured for determining a finger action according to a detected finger force (such as a detected normal or shear force), finger force direction, change of an overall finger force magnitude, change in a finger force direction, rate of finger force change, and/or rate of change of a finger force direction. According to some implementations, the control system may be configured for determining a finger action according to a number of taps and/or timing of tapping a finger against a platen surface; a number of instances and/or timing of increasing force/pressure and decreasing force/pressure of a finger that remains in physical contact with the platen surface; a number of instances, timing and/or a direction of generating and releasing shear force from a finger sliding along or remaining in contact with the platen surface; and/or a rate, timing and direction of twist of a finger in contact with the platen surface. In some implementations, the determined finger action may initiate, select or modify a function or an application running on a mobile device. According to some implementations, the control system may be configured for determining a finger action by detecting both a finger position and a finger force or changes to the finger position and/or force of a finger on the platen.

Particular implementations of the subject matter described in this disclosure may be implemented to realize one or more of the following potential advantages. Detected finger actions may, in some examples, correspond with various types of user input. For example, a sustained "hard press" (e.g. high force) finger action may correspond with user input indicating that a transaction should be confirmed. A brief "light press" (e.g. low force) finger action may, in some instances, correspond with user input for previewing a message before opening it. A brief, high normal force of a finger pressing against a platen surface may correspond to an action that makes a selection. A low, sustained normal force of a finger may correspond to an action that scrolls through a menu. A low shear force from a finger pressing sideways (sliding or stationary) on a platen surface may correspond to an action that moves a cursor, pointer or selection icon sideways depending on the direction of the shear force. A high shear force from a finger pressing sideways may correspond to an action that moves a cursor, pointer or selection icon sideways in the corresponding direction at a faster rate. An upwards or downwards motion of a finger pressing on the platen surface may correspond to movements of a cursor, pointer or selection icon upwards or downwards on a display device depending on the magnitude and/or direction of the shear force. A rotational motion of a finger on the platen surface (sliding or not sliding) may correspond to a desire to rotate an image on the display device clockwise or counterclockwise to a landscape or portrait view or to perform another function. A zoom-in or zoom-out function may correspond to a clockwise or counter-clockwise torque applied by the finger against the platen. Note that these actions may be performed without the use of a touchscreen on a display device or without an external mouse, scroll wheel, trackpoint or trackball. These actions may be performed with a multi-functional fingerprint sensor mounted on the front side, backside or sidewall of a mobile device enclosure. In some implementations with a multi-functional fingerprint sensor mounted on the backside of a mobile device enclosure, a second fingerprint sensor may be mounted on the front side of the same enclosure.

Additional information, such as the time duration of pressing, a number of "clicks" or pressings of a finger, or a time interval between pressings (normal and/or shear) on a platen surface may be used to allow more types of user actions to be detected. In some examples, the control system may be configured for controlling the apparatus based, at least in part, on a determined finger action. In some such examples, the control system may be configured for providing at least one of mouse functionality or joystick functionality for controlling the apparatus based, at least in part, on a detected finger force magnitude, direction and/or sequence, which may be conducted through direct detection of force or through a secondary effect resulting from such force, such as the relative strength of ultrasonic reflections from fingerprint valleys and ridges, the relative position of such stronger or weaker reflections, or the distance between such reflections.

In some examples, the ultrasonic fingerprint sensor may be able to detect changes in skin temperature and/or changes in skin hydration status (such as monitoring indications of dehydration of the user). In some examples, the ultrasonic fingerprint sensor may be augmented with one or more detection electrodes to aid in further determining skin oiliness, skin hydration or a skin condition. Accordingly, in some implementations an ultrasonic fingerprint sensor can provide multi-functional sensor capabilities.

FIG. 1 is a block diagram that shows example components of an apparatus according to some disclosed implementations. In this example, the apparatus 101 includes an ultrasonic sensor system 102, a control system 106 and a platen 110. Some implementations of the apparatus 101 may include an interface system 104.

In some examples, as suggested by the dashed lines within the ultrasonic sensor system 102, the ultrasonic sensor system 102 may include an ultrasonic sensor array 103 and a separate ultrasonic transmitter 105. In some such examples, the ultrasonic transmitter 105 may include an ultrasonic plane-wave generator, such as those described below.

However, various examples of ultrasonic sensor systems 102 are disclosed herein, some of which may include a separate ultrasonic transmitter 105 and some of which may not. Although shown as separate elements in FIG. 1, in some implementations the ultrasonic sensor array 103 and the ultrasonic transmitter 105 may be combined in an ultrasonic transceiver system. For example, in some implementations, the ultrasonic sensor system 102 may include a piezoelectric receiver layer, such as a layer of PVDF polymer or a layer of PVDF-TrFE copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The ultrasonic sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1. The control system 106 may be capable of receiving and processing data from the ultrasonic sensor system 102, e.g., from the ultrasonic sensor array 103. If the apparatus 101 includes a separate ultrasonic transmitter 105, the control system 106 may be capable of controlling the ultrasonic transmitter 105, e.g., as disclosed elsewhere herein. In some implementations, functionality of the control system 106 may be partitioned between one or more controllers or processors, such as between a dedicated sensor controller and an applications processor of a mobile device.

Some implementations of the apparatus 101 may include an interface system 104. In some examples, the interface system may include a wireless interface system. In some implementations, the interface system may include a user interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the ultrasonic sensor system 102. According to some such examples, a portion of the interface system 104 may couple at least a portion of the control system 106 to the ultrasonic sensor system 102, e.g., via electrically conducting material. If the apparatus 101 includes an ultrasonic transmitter 105 that is separate from the ultrasonic sensor array 103, the interface system 104 may be configured to provide communication between at least a portion of the control system 106 and the ultrasonic transmitter 105. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a system packet interface (SPI)). In some implementations, the apparatus 101 may include a memory system. The interface system 104 may, in some examples, include at least one interface between the control system 106 and a memory system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
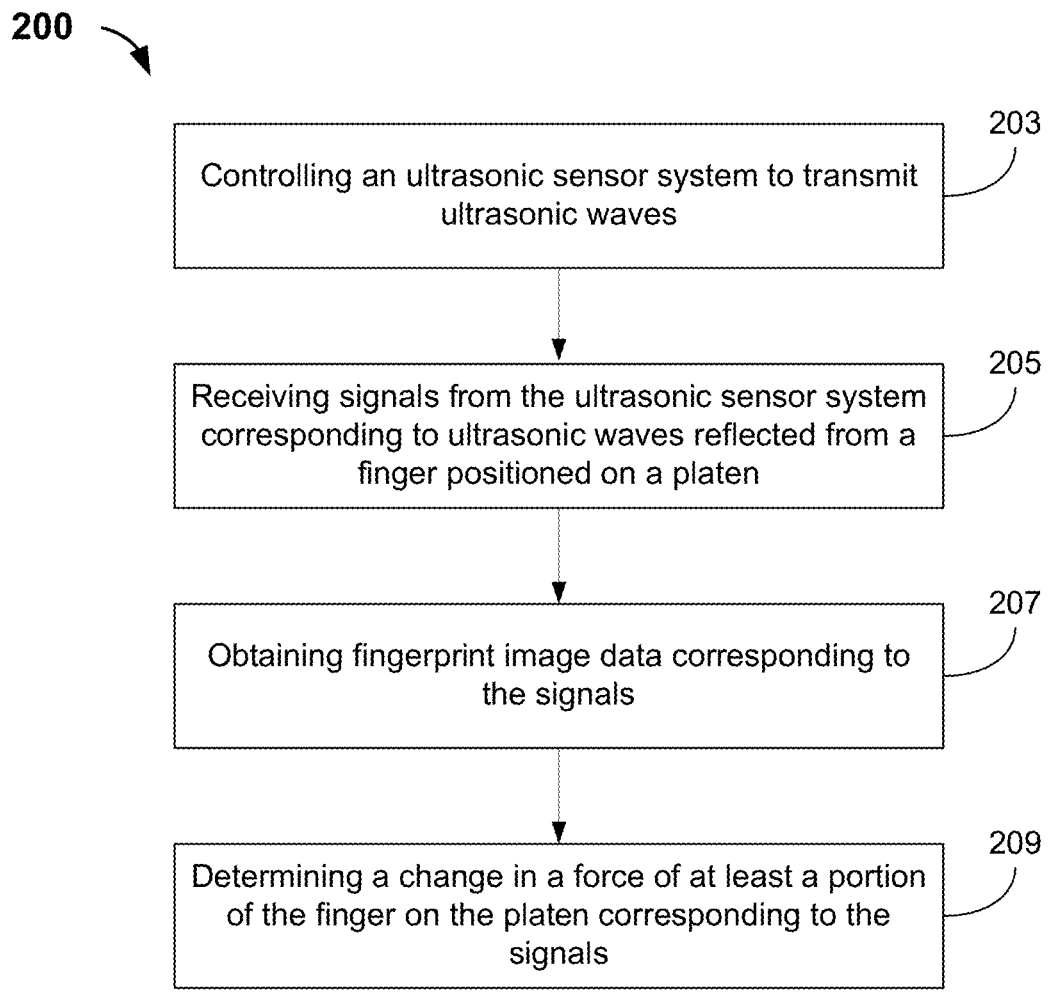
FIG. 2 is a flow diagram that provides example blocks of some methods disclosed herein.

FIG. 2 is a flow diagram that provides example blocks of some methods disclosed herein. The blocks of FIG. 2 (and those of other flow diagrams provided herein) may, for example, be performed by the apparatus 101 of FIG. 1 or by a similar apparatus. As with other methods disclosed herein, the method outlined in FIG. 2 may include more or fewer blocks than indicated. Moreover, the blocks of methods disclosed herein are not necessarily performed in the order indicated.

In this example, block 203 involves controlling an ultrasonic sensor system, such as the ultrasonic sensor system 102 of FIG. 1, to transmit ultrasonic waves. According to this implementation, block 205 involves receiving signals from the ultrasonic sensor system corresponding to ultrasonic waves reflected from a finger positioned on a platen. In some examples, block 205 may involve receiving signals from the ultrasonic sensor system corresponding to ultrasonic waves reflected from another type of target object positioned on a platen.

According to this example, block 207 involves obtaining fingerprint image data corresponding to the signals. As used herein, the term "fingerprint image data" may refer generally to data obtained from, or data based on signals obtained from, a target object such as a finger that may include a fingerprint. The fingerprint image data may or may not be presented in a form that is recognizable to a human being as being an image. For example, the fingerprint image data may be, or may include, a data structure in which numerical values are arranged and/or stored. The numerical values may, in some examples, correspond to signals received from an ultrasonic sensor system, an optical sensor system, a capacitive sensor system, etc. In some examples, the fingerprint image data may correspond to signals received from a sensor system during a time window. In some instances, the fingerprint image data may correspond to signals received from a particular area, such as a fingerprint contact area. Examples of fingerprint contact areas are described below. In some instances, the fingerprint image data may be, or may include, data that has been aggregated and/or processed in some manner after having been acquired from a sensor system. In some examples, the fingerprint image data may include indications of one or more fingerprint features detected in at least a portion of the signals from the sensor system (such as an ultrasonic sensor system). The fingerprint features may include one or more fingerprint ridge features and one or more fingerprint valley features. The fingerprint features may, for example, be detected by a control system such as the control system 106 of FIG. 1.

Signals indicating fingerprint ridge features may generally be obtained from sensor pixels of the ultrasonic sensor system that are responding to ultrasonic waves that have been reflected from platen/fingerprint ridge interfaces. Signals indicating fingerprint valley features may generally be obtained from sensor pixels that are responding to ultrasonic waves that have been reflected from platen/fingerprint valley interfaces. The reflections from a platen/fingerprint valley interface will generally be reflections from a platen/air interface, whereas the reflections from a platen/fingerprint ridge interface will generally be reflections from a platen/skin interface, corresponding to areas in which fingerprint ridges are in contact with a platen.

In various examples disclosed herein, R1 represents an amplitude of a reflected ultrasonic wave from a platen/fingerprint ridge interface and R2 represents an amplitude of a reflected ultrasonic wave from a platen/fingerprint valley interface. The amplitude R1 may be expressed as follows:

$$R1 = \frac{(Zskin - Zplaten)}{(Zskin + Zplaten)} \quad \text{(Equation 1)}$$

In Equation 1, $Z_{skin}$ represents the acoustic impedance of skin and $Z_{platen}$ represents the acoustic impedance of a platen. A typical acoustic impedance of skin is about 1.8 MRayl. A glass platen would typically have an acoustic impedance of about 13.7 MRayl and an aluminum platen would typically have an acoustic impedance of about 16.9 MRayl. Assuming that a reflection from a platen/fingerprint valley interface is a reflection from a platen/air interface, the amplitude R2 may be expressed as follows:

$$R2 = \frac{(Zair - Zplaten)}{(Zair + Zplaten)} \quad \text{(Equation 2)}$$

In Equation 2, $Z_{air}$ represents the acoustic impedance of air. A typical acoustic impedance of air is about 0.00043 MRayl.

In view of the foregoing equations and acoustic impedance values, it is clear that a platen/air interface will generally provide a higher-amplitude reflection (corresponding with R2) than a platen/fingerprint ridge interface (corresponding with R1). Therefore, fingerprint valley features will generally correspond to regions of relatively high-amplitude signals and fingerprint ridge features will generally correspond to regions of relatively low-amplitude signals. Fingerprint valley features may, for example, correspond with continuous or piecewise-continuous regions of relatively high-amplitude signals and fingerprint ridge features may correspond with continuous or piecewise-continuous regions of relatively low-amplitude signals. The continuous or piecewise-continuous regions may correspond to lines have varying degrees of curvature. For example, a relatively straight ridge or valley may have a small curvature and a highly curved ridge or valley, such as those in a fingerprint whorl region, may have a high curvature.

In some examples the fingerprint ridge and valley features may include pattern information and/or fingerprint minutiae such as ridge ending information, ridge bifurcation information, short ridge information, ridge flow information, island information, spur information, delta information, core information, etc. Accordingly, in some instances the fingerprint features may be suitable for performing an authentication process. In some implementations, a control system (such as the control system 106 of FIG. 1) may be capable of initiating an authentication process that is based, at least in part, on the fingerprint features. In some implementations, the control system may be capable of performing an authentication process that is based, at least in part, on the fingerprint features.

In this example, block 209 involves determining a change in a force (such as a change in normal or shear force) of at least a portion of the finger on the platen corresponding to the signals. Various examples are disclosed herein. Several phenomena allow changes in applied finger force to be detected by analyzing signals provided by an ultrasonic fingerprint sensor. One phenomenon is that when a finger (or another body part) is pressed relatively harder against a platen, the area in contact with the platen changes. For example, the widths of the ridge regions in contact with the platen may increase and the widths of the valley regions between the ridge regions may decrease. Some examples of this phenomenon are shown in FIGS. 3A-4D.

Figure 3A:
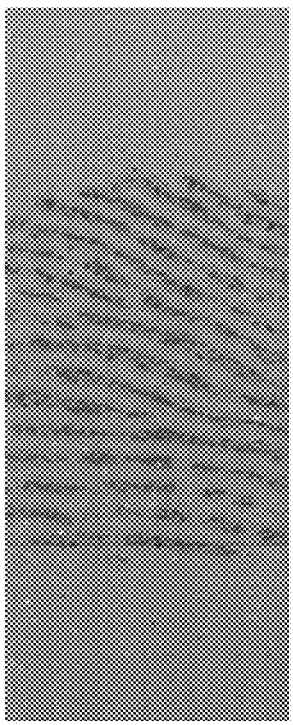
FIGS. 3A and 3B are images that correspond with signals provided by an ultrasonic fingerprint sensor for a light finger touch and a heavy finger touch, respectively.
Figure 3B:
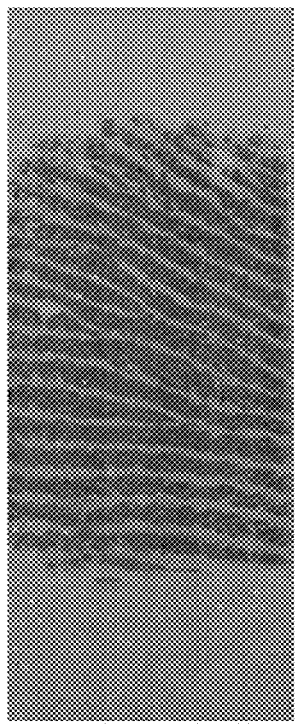

FIGS. 3A and 3B are images that correspond with signals provided by an ultrasonic fingerprint sensor for a light finger touch and a heavy finger touch, respectively. In FIGS. 3A and 3B, the dark areas are areas of relatively low-amplitude signals that correspond with reflections from platen/fingerprint ridge interfaces (corresponding with R1). Accordingly, the dark areas are examples of fingerprint ridge features, corresponding to areas in which fingerprint ridges are in contact with a platen of the ultrasonic fingerprint sensor. The light areas in FIGS. 3A and 3B are areas of relatively high-amplitude signals that correspond with reflections from a platen/air interface (corresponding with R2). The light areas that are interposed between the fingerprint ridge features in FIGS. 3A and 3B are examples of fingerprint valley features.

FIG. 3A is a graphic representation of signals provided by an ultrasonic fingerprint sensor when a finger is pressing on a platen with a relatively smaller force, whereas FIG. 3B is a graphic representation of signals provided by the ultrasonic fingerprint sensor when the same finger is pressing on the platen with a relatively larger force. It may be observed that the fingerprint ridge features in FIG. 3B are darker than the fingerprint ridge features in FIG. 3A. Moreover, it may be seen that the fingerprint ridge features in FIG. 3B are relatively thicker than the fingerprint ridge features in FIG. 3A, and that the fingerprint valley features in FIG. 3B are relatively thinner than the fingerprint valley features in FIG. 3A.

Accordingly, the fingerprint ridge features in FIG. 3B occupy a relatively larger percentage of the platen surface than the fingerprint ridge features in FIG. 3A. Because the fingerprint ridge features correspond to areas of relatively lower-amplitude signals, a relatively larger percentage of the reflections received by the ultrasonic fingerprint sensor will produce relatively lower-amplitude signals (corresponding with R1) when a finger is pressing on the platen with a relatively larger force. Accordingly, the median amplitude of signals provided by the ultrasonic fingerprint sensor will decrease when a finger is pressing on the platen with a relatively larger force. Another way of expressing this condition is that a sum (or average) of the reflected signals R1 and R2 from the platen-finger interface will decrease when a finger is pressing on the platen with a relatively larger force. In some implementations, a bounding box (e.g. a finger outline) may be determined to delineate the portion of a finger that is in contact with the platen and to define a fingerprint region that is within the bounding box (e.g., a region having fingerprint features) and a non-fingerprint region that is external to the bounding box (e.g., a region having no fingerprint features). Subsequently, the reflected signals from sensor pixels within the fingerprint region may be used to determine an indication of the amount of force applied by the finger by comparing the area of the fingerprint ridges to the area of the fingerprint valleys, determining a ratio of ridge area to the area of the fingerprint region, or alternatively, by adding all of the signals within the bounding box (or in some examples throughout the entire active area of the sensor) to determine a measure of the applied force.

Figure 4A:
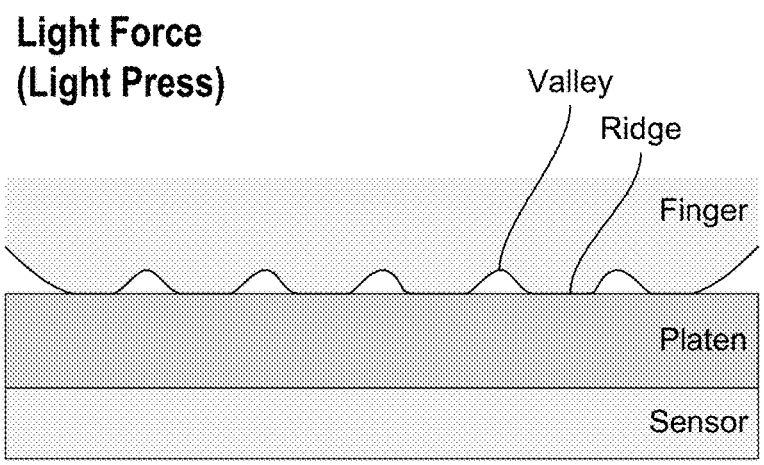
FIGS. 4A and 4B depict a portion of a finger being pressed with a light force and a heavy force, respectively, against a smooth platen.
Figure 4B:
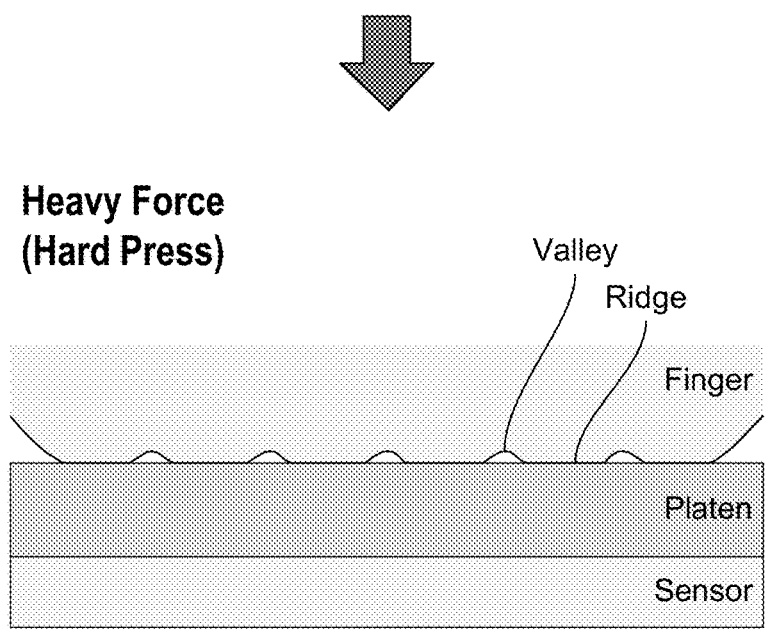
Figure 4C:
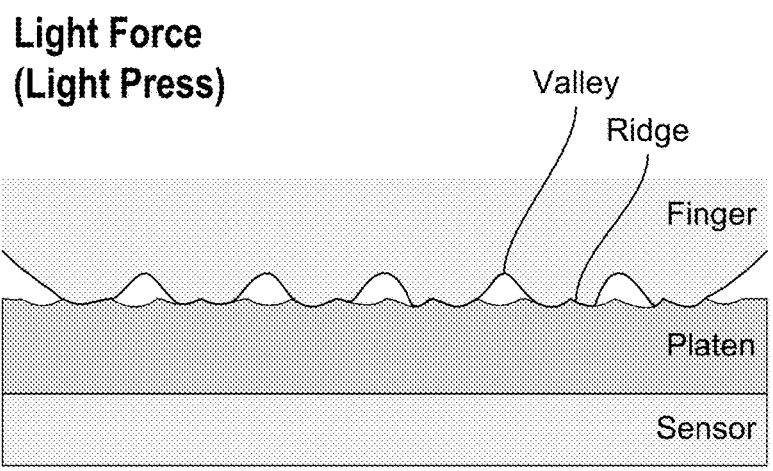
FIGS. 4C and 4D show the portion of the finger being pressed with a light force and a heavy force, respectively, against a relatively rough platen.
Figure 4D:
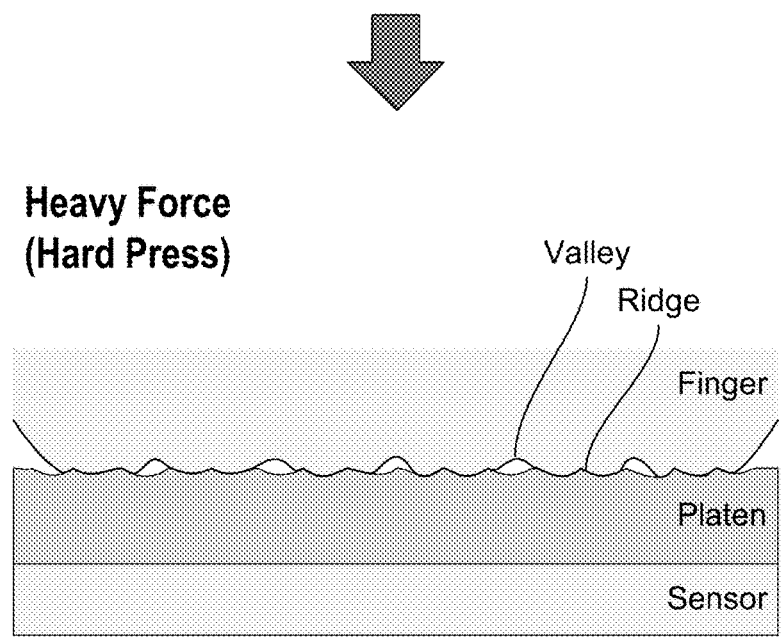

The images shown in FIGS. 3A and 3B were obtained by an ultrasonic fingerprint sensor having a relatively smooth platen, as illustrated in FIGS. 4A and 4B wherein a portion of a finger is pressed with a light force and a heavy force, respectively, against a smooth platen. A light press presents relatively less ridge area and more valley area against an outer surface of the platen as shown in FIG. 4A, compared to a hard press that presents more ridge area and less valley area against the outer surface of the platen as shown in FIG. 4B. The above-described effects can be enhanced when the surface of the platen of an ultrasonic fingerprint sensor is at least slightly rough. FIGS. 4C and 4D show the portion of the finger being pressed with a light force and a heavy force, respectively, against a relatively rough platen. As a result of pressing harder, fingerprint ridges may deform to fill small gaps and valleys between the platen and the finger. Accordingly, the contact area of the "heavy force" example may increase relative to the "light force" example, for either rough or smooth platens. In some implementations, a rough or moderately rough platen may represent a ground yet unpolished aluminum or metal platen. In some implementations, a rough or moderately rough platen may represent a matte or textured finish of a glass or plastic cover lens of a display device.

Therefore, in some implementations block 209 of FIG. 2 may involve determining a change in the force of at least a portion of a finger on a platen according to detected changes in contact areas of fingerprint ridges on the platen. For example, a control system may be configured for determining a change in the force according to detected changes in contact areas of fingerprint ridges on the platen or in the relative change between the aggregate ridge area and the aggregate valley area within the fingerprint region. In another example, the control system may be configured for determining a change in the finger force according to detected changes in the sum of the reflected signals within the fingerprint region. In another example, the control system may be configured for determining a change in the finger force according to detected changes in the area of one or more ridge regions. In other examples, the control system may be configured for determining a change in the finger force according to detected changes in the width of one or more fingerprint ridges or an average of one or more fingerprint ridges, or alternatively according to detected changes in the width of one or more fingerprint valleys, an average width of one or more fingerprint valleys, or a ratio of the width of one or more fingerprint ridges to the width of one or more fingerprint valleys.

Another phenomenon that can allow changes in applied finger force/pressure to be detected by an ultrasonic fingerprint sensor is that when the finger is pressed relatively harder against the platen, the tissue in the region of a ridge becomes relatively denser, which corresponds to a larger value of $Z_{skin}$. Accordingly, in some implementations block 209 of FIG. 2 may involve determining a change in the force of at least a portion of a finger on a platen according to indications of acoustic impedance changes.

For example, a control system may be configured for determining a change in the force of a finger that is pressed against a platen according to indications of increased acoustic impedance in fingerprint ridge areas. By reference to Equation 1, it may be seen that a relatively larger value of $Z_{skin}$ will result in a relatively smaller amplitude of the reflected ultrasonic waves R1, which are ultrasonic waves received from fingerprint ridge areas. In some implementations, detecting indications of increased acoustic impedance in fingerprint ridge areas may involve detecting indications that the amplitude of signals corresponding to reflections from platen/fingerprint ridge interfaces (which may be referred to herein as "signals R1" or simply "R1") have decreased.

In some implementations, an indication of acoustic impedance changes may be based, at least in part, on a change in a difference between R1 and R2 or a change in a sum of R1 and R2. Some such implementations may involve determining whether a delta output signal (e.g., R2−R1) has increased. Some examples may involve determining whether a sum of R1 and R2 (e.g., (R1+R2)/2) has decreased. In some implementations, the value of R1 or an average value for R1 may be determined by first processing the fingerprint images to determine one or more ridge regions, then operating on output signals from the one or more ridge regions. Similarly, in some implementations, the value of R2 or an average value for R2 may be determined by first processing the fingerprint images to determine one or more valley regions, then operating on output signals from the one or more valley regions.

In some examples, a control system may be capable of detecting changes in skin temperature according to signals from an ultrasonic sensor. Some such implementations may rely on the observation that the Young's modulus of skin decreases as temperature increases. For example, as skin temperature increases from 37 to 39 degrees Centigrade, the Young's modulus of skin may decrease by approximately 12%. As the Young's modulus of skin decreases, the speed of sound in the skin decreases and therefore the acoustic impedance of skin, $Z_{skin}$, decreases. By reference to Equation 1, it may be seen that a relatively smaller value of $Z_{skin}$ results in a relatively larger amplitude of the reflected waves R1 from a platen/fingerprint ridge interface.

Moreover, the gradient of the received signals and the speed at which equilibrium is reached after a finger is placed on a platen of an ultrasonic fingerprint sensor can indicate differences in skin temperature. For example, the higher the skin temperature, the faster that equilibrium may be reached. Colder fingers, as those in colder climates know, may be slower to equilibrate.

Body temperature may be regulated through blood vessels and through the process of sweating. During athletic activity, sweating makes a finger (or another part of a user's body) relatively wetter. Wet skin normally has a smaller acoustic impedance than dry skin, due in part to the epidermal (outer) layer of skin on the finger becoming softer, the speed of sound in the softer material becoming slower, and the acoustic impedance of the wet skin lessening with increasing hydration resulting in an increase in the average output signal. However, the contact area between the finger and the platen increases for the same applied force, reducing the magnitude of the reflected signals in the regions of increased contact, reducing the average value of the reflected signals, increasing the delta (R2–R1) signals, and decreasing the average output signal. When considering sweat pores filling with liquid during increased sweating, the contact area increases, the reflected signals decrease in the region of the filled sweat pores, the delta (R2–R1) signals increase, and the average output signal decreases. While some of the factors described may partially compensate others, the output signal(s) from the ultrasonic sensor can provide an indicating of hydration and sweating.

In some implementations, a control system may be capable of detecting sweat on a finger or on another part of a user's body according to input from an ultrasonic sensor. In some examples, a control system may be capable of detecting changes in skin hydration status according to signals from an ultrasonic sensor. According to some implementations, a control system may be capable of tracking the hydration status of a user, for example during sports and athletic activities, according to input from an ultrasonic fingerprint sensor. In some examples, the control system may be configured for detecting changes in skin hydration status (e.g., of finger hydration status) over a period of time. According to some such examples, the changes in skin hydration status may correspond with multiple instances of receiving signals from the ultrasonic sensor system.

According to some implementations, changes in a user's hydration status may be detected according to changes in the strength of a delta output signal (e.g., R2–R1). For example, in a 5-km race, a user's skin (e.g., a finger) may stay relatively wet due to sweating. The delta signal will be relatively smaller while the skin is wet. If the ultrasonic sensor starts to detect a larger delta signal in one or more ridge regions, this may indicate that the sweating process is becoming limited and that the athlete may be entering a state of dehydration.

Some implementations may involve detecting force changes, changes in a user's temperature and/or changes in a user's hydration status based on ultrasonic data obtained from parts of the body other than a portion of a finger on which a user's fingerprint is formed. For example, a user's wrist region also includes skin features that are broadly similar to fingerprint ridges and valleys, though skin features in a user's wrist region have different geometries. Although R1 has been described elsewhere herein as corresponding to reflections from a platen/fingerprint ridge interface, R1 may be considered more generally as corresponding to reflections from a platen/skin interface.

Accordingly, ultrasonic data obtained from a user's wrist may be used to determine changes in a user's temperature and/or changes in a user's hydration status. In some such implementations, the ultrasonic data for determining changes in a user's temperature and/or changes in a user's hydration status may be obtained via an ultrasonic sensor system that is provided in a wrist band, a watch, etc. In some examples, the ultrasonic data for determining changes in a user's temperature and/or changes in a user's hydration status may be obtained via an ultrasonic sensor system that is provided in a skin patch, a headband, an armband, a ring, or another wearable device.

Figure 5:
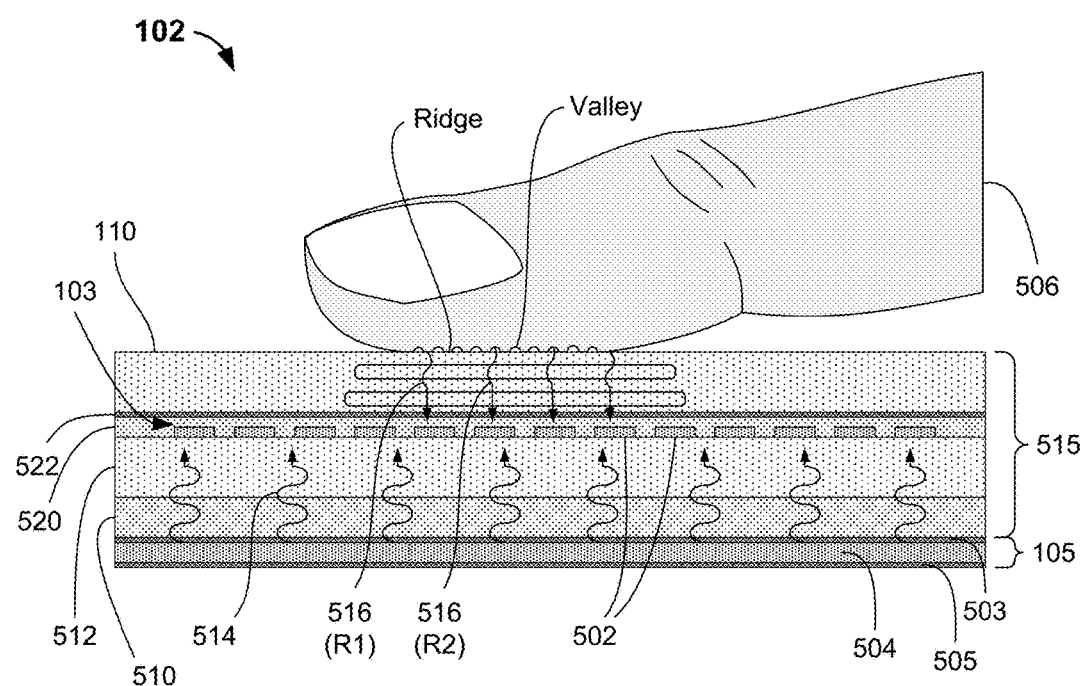
FIG. 5 shows an example of a cross-sectional view of an apparatus capable of performing at least some methods that are described herein.

FIG. 5 shows an example of a cross-sectional view of an ultrasonic sensor system capable of performing at least some methods that are described herein. For example, the ultrasonic sensor system 102 may be capable of performing the methods that are described above, e.g., with reference to FIGS. 1 and 2. Here, the ultrasonic sensor system 102 is an example of the ultrasonic sensor system 102 that is described above with reference to FIG. 1. As with other implementations shown and described herein, the types of elements, the arrangement of the elements and the dimensions of the elements illustrated in FIG. 5 are merely shown by way of example.

FIG. 5 shows an example of ultrasonic waves reflecting from a target object. In this example, the target object is a finger 506 being insonified by transmitted ultrasonic waves 514. Here, reflected ultrasonic waves 516 that are received by the ultrasonic sensor system 102 include instances of R1, reflected from interfaces between the platen 110 and fingerprint ridges, as well as instances of R2, reflected from interfaces between the platen 110 and air/fingerprint valleys.

In this example, the ultrasonic sensor system includes an ultrasonic transmitter 105 that is separate from an ultrasonic sensor array 103. In the example shown in FIG. 5, the ultrasonic transmitter 105 can function as a plane-wave ultrasonic transmitter. In some implementations, the ultrasonic transmitter 105 may include a piezoelectric transmitter layer 504 with one or more transmitter excitation electrodes 503, 505 disposed on each side of the piezoelectric transmitter layer.

In some such examples, the ultrasonic sensor array 103 may include an array of pixel input electrodes and sensor pixels formed in part from TFT- or silicon-based circuitry, an overlying piezoelectric receiver layer 520 of piezoelectric material such as PVDF or PVDF-TrFE, and an upper electrode layer positioned on the piezoelectric receiver layer 520, which will sometimes be referred to herein as a receiver bias electrode 522. Examples of suitable ultrasonic transmitters and ultrasonic receiver arrays are described below with reference to FIGS. 20A-20C.

In alternative implementations, the ultrasonic sensor array 103 and the ultrasonic transmitter 105 may be combined in an ultrasonic transceiver array. For example, in some implementations, the ultrasonic sensor system may include a piezoelectric receiver layer, such as a layer of PVDF polymer or a layer of PVDF-TrFE copolymer. In some implementations, a separate piezoelectric layer may serve as the ultrasonic transmitter. In some implementations, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor system may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

In this example, the transmitted ultrasonic waves 514 have been transmitted from the ultrasonic transmitter 105 through a sensor stack 515 and towards the overlying finger 506. The various layers of the sensor stack 515 may, in some examples, include one or more substrates of glass or other material (such as plastic or sapphire) that is substantially transparent to visible light. In this example, the sensor stack 515 includes a substrate 510 to which a light source system (not shown) may be coupled, which may be a backlight of a display according to some implementations. In alternative implementations, a light source system may be coupled to a front light. Accordingly, in some implementations a light source system may be configured for illuminating a display and the target object.

In this implementation, the substrate 510 is coupled to a thin-film transistor (TFT) substrate 512 for the ultrasonic sensor system. According to this example, a piezoelectric receiver layer 520 overlies sensor pixels 502 of the ultrasonic sensor array 103 and the platen 110 overlies the piezoelectric receiver layer 520. Accordingly, in this example the ultrasonic sensor system 102 is capable of transmitting the ultrasonic waves 514 through one or more substrates of the sensor stack 515 that include the ultrasonic sensor system with substrate 512, as well as the platen 110 that may also be viewed as a substrate. In some implementations, sensor pixels 502 of the ultrasonic sensor array 103 may be transparent, partially transparent or substantially transparent, such that the apparatus 101 may be capable of transmitting light from a light source system through elements of the ultrasonic sensor system. In some implementations, the ultrasonic sensor system and associated circuitry may be formed on or in a glass, plastic or silicon substrate. However, in some implementations one or more of the substrates of the apparatus 101 may be translucent or opaque to visible light.

Figure 6A:
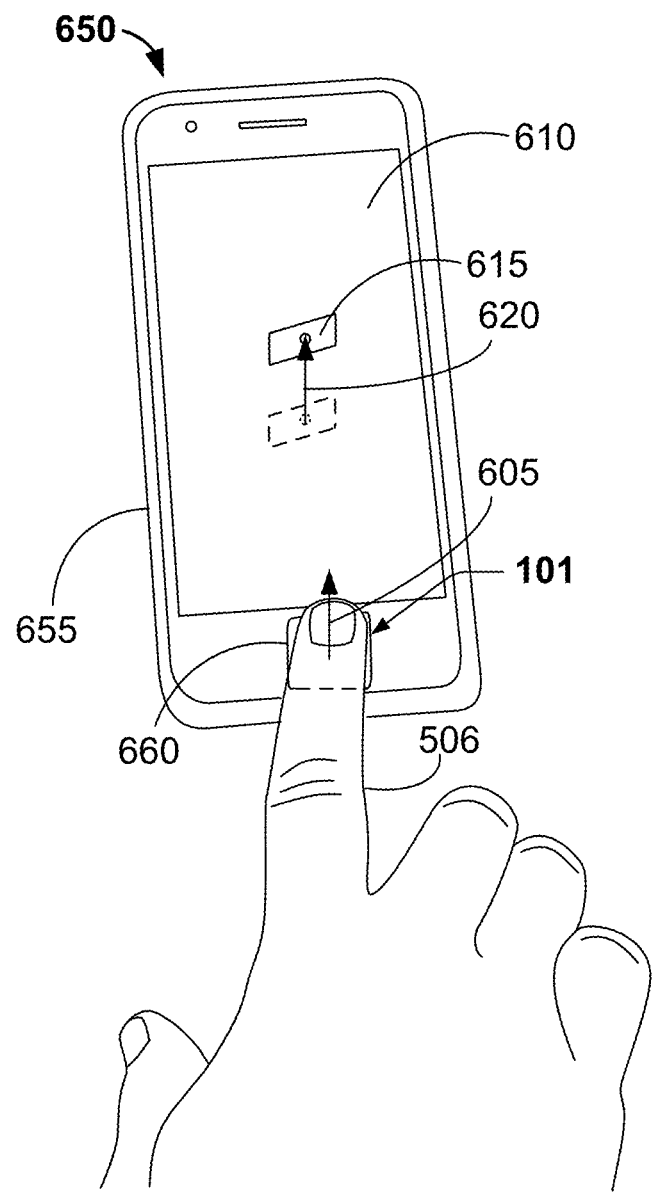
FIGS. 6A and 6B show examples of a mobile device that is configured for providing mouse functionality and/or joystick functionality.
Figure 6B:
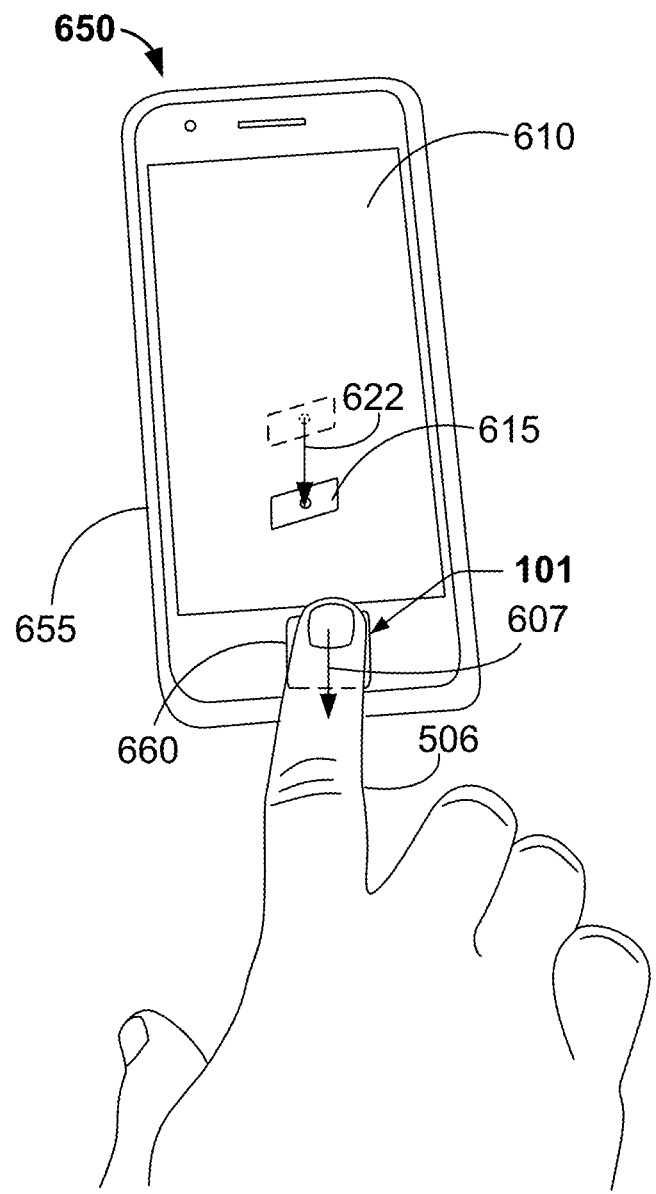

FIGS. 6A and 6B show examples of a mobile device that includes an ultrasonic sensor system as disclosed herein. In this example, the mobile device 650 is depicted as a smartphone. However, in alternative examples the mobile device 650 may another type of mobile device, such as a mobile health device, a wearable device, a tablet computer, etc.

In this example, the mobile device 650 includes an instance of the apparatus 101 that is described above with reference to FIG. 1. In this example, the apparatus 101 is disposed, at least in part, within the mobile device enclosure 655. According to this example, at least a portion of the apparatus 101 is located in the portion of the mobile device 650 that is shown being touched by a finger 506, which corresponds to the location of button 660. Accordingly, the button 660 may be an ultrasonic button. In some implementations, the button 660 may serve as a home button. In some implementations, the button 660 may serve as an ultrasonic authenticating button, with the ability to turn on or otherwise wake up the mobile device 650 when touched or pressed and/or to authenticate or otherwise validate a user when applications running on the mobile device (such as a wake-up function) warrant such a function.

In this implementation, the mobile device 650 may be capable of performing a user authentication process. For example, a control system of the mobile device 650 may be capable of comparing attribute information obtained from data received via an ultrasonic sensor array of the apparatus 101 with stored attribute information obtained from data that has previously been received from an authorized user. In some examples, the attribute information obtained from the received data and the stored attribute information may include attribute information corresponding to fingerprint minutia. In some implementations, the fingerprint and/or attribute information may be stored as one or more enrollment templates.

In some implementations, a control system of the apparatus 101 and/or of the mobile device 650 may be configured for determining a finger action according to a detected finger position, a change in finger position, a rate of change and direction of a finger position, a finger force direction, detected changes of an overall finger force, and/or a detected rate of finger force change. The finger action may, for example, include one or more low-force touches, an increasing finger touch force, a finger tilt, a finger lift, a finger rotation and/or a series of alternating low-force and high-force finger touches. According to some such examples, a control system may be configured for controlling an apparatus (such as the apparatus 101 and/or the mobile device 650) based, at least in part, on a determined finger action.

FIGS. 6A and 6B show examples of a mobile device that is configured for providing mouse functionality and/or joystick functionality. In these examples, a control system of the mobile device 650 may be configured for providing mouse functionality and/or joystick functionality for controlling the mobile device 650 based, at least in part, on a detected finger force direction or through one or more secondary effects resulting from such force. Examples of secondary effects resulting from a finger force include the relative strength of ultrasonic reflections from fingerprint valleys and ridges, the relative position of such stronger or weaker reflections, or the distance between such reflections. In the example shown in FIG. 6A, a control system is detecting an "upward" force of the finger 506, in the direction of the arrow 605, according to changes in signals received from a fingerprint sensor 660 of the apparatus 101. One example is shown in FIG. 7A and is described below. In response to detecting the upward force of the finger 506, the control system may cause a display 610 of the mobile device 650 to move an image of an object 615 in the direction of the arrow 620, which is parallel to the arrow 605 in this example. In some implementations, the fingerprint sensor 660 may be, or may at least be a portion of, an ultrasonic sensor system 102 such as described elsewhere herein. However, in some implementations the fingerprint sensor 660 may be another type of fingerprint sensor, such as an optical fingerprint sensor, a capacitive fingerprint sensor, a radio frequency fingerprint sensor, a thermal fingerprint sensor, etc.

In the example shown in FIG. 6B, a control system is detecting a "downward" force of the finger 506, in the direction of the arrow 607, according to changes in signals received from an ultrasonic sensor system of the apparatus 101. One example of an image corresponding to such signals is shown in FIG. 7B and is described below. In response to detecting the downward force of the finger 506, the control system causes the display 610 to move the image 615 in the direction of the arrow 622, which is parallel to the arrow 607 in this example. In some implementations, the finger 506 in FIG. 6A and FIG. 6B may slide upwards or downwards upon a platen surface of the apparatus 101. In other implementations, the finger 506 in FIG. 6A and FIG. 6B may be moved upwards or downwards on the platen surface without sliding, relying on shear forces, distortions of fingerprint ridges and valleys, and/or displacements of fingerprint features with respect to an edge of the fingerprint region to make the determinations.

FIGS. 7A and 7B are images that represent fingerprint image data corresponding to upward and downward finger forces, respectively. In FIG. 7A, an upward force is indicated by the presence of fingerprint ridge and valley features primarily in the upper portion of the image, whereas in FIG. 7B a downward force is indicated by the presence of fingerprint ridge and valley features primarily in the lower portion of the image. This effect may or may not be caused by sliding the finger. In some instances, this effect may be a result of rocking the finger forward or backward, and/or by changes in the shape of the finger due to shear stress. Such changes in the shape of a finger may be referred to herein as "finger distortions." Accordingly, in some implementations a finger force direction may be detected according to changes in fingerprint ridge patterns corresponding with a shear stress of fingerprint ridges in contact with the platen. In some implementations, the speed at which a cursor or pointer may be moved on a display of the mobile device may be determined from measurements of the reflected ultrasonic wave and calculations of the magnitude and direction of the finger forces. For example, a higher measured finger force (normal force or shear force) may result in faster movement of a cursor or pointer on the display. Similarly, a lower measured finger force may result in slower movement of the cursor or pointer on the display.

Figure 8A:
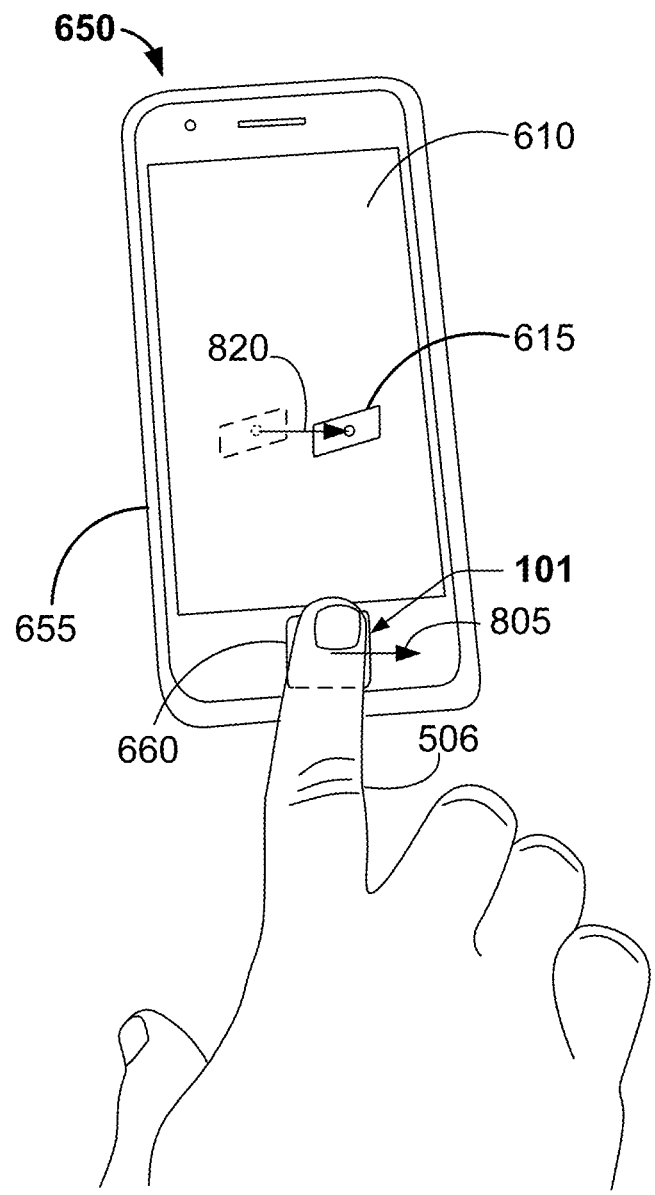
FIGS. 8A and 8B show additional examples of a mobile device that is configured for providing mouse functionality and/or joystick functionality.
Figure 8B:
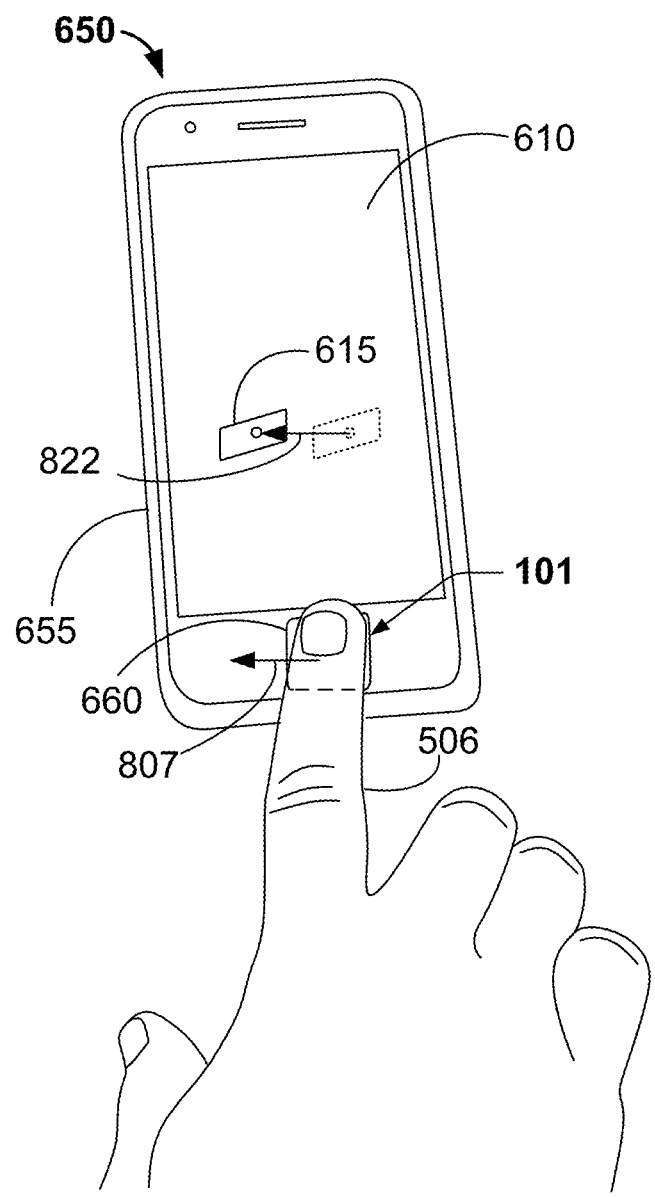

FIGS. 8A and 8B show additional examples of a mobile device that is configured for providing mouse functionality and/or joystick functionality. As with the examples that are described above with reference to FIGS. 6A and 6B, in this implementation a control system of the mobile device 650 is configured for providing mouse functionality and/or joystick functionality for controlling the mobile device 650 based, at least in part, on a detected finger force direction. In the example shown in FIG. 8A, a control system is detecting a lateral (e.g., a sideward or shear) force of the finger 506, in the direction of the arrow 805, according to changes in signals received from a fingerprint sensor 660 of the apparatus 101. One example is shown in FIG. 9A and is described below. In response to detecting the lateral force of the finger 506, in this example the control system causes a display 610 of the mobile device 650 to move an image of an object 615 in the direction of the arrow 820, which is parallel to the arrow 805 in this example.

In the example shown in FIG. 8B, a control system is detecting a lateral force of the finger 506 in the direction of the arrow 807, according to changes in signals received from a fingerprint sensor 660 of the apparatus 101. One example of an image corresponding to such signals is shown in FIG. 9B and is described below. In response to detecting the lateral force of the finger 506, in this example the control system causes the display 610 to move an image of an object 615 in the direction of the arrow 822, which is parallel to the arrow 807 in this example.

FIGS. 9A and 9B are images that represent fingerprint image data corresponding to lateral (e.g., left- and right-directed) finger forces. In FIG. 9A, a rightward force is indicated by the presence of a higher concentration of fingerprint ridge and valley features in the right side of the image, whereas in FIG. 9B a leftward force is indicated by a higher concentration of fingerprint ridge and valley features in the left side of the image. This effect may or may not be caused by sliding the finger. In some instances, this effect may be a result of rocking the finger to the right or to the left, and/or by changes in the shape of the finger due to shear stress, particularly near the edges of the finger contact area.

The examples shown in FIGS. 6A, 6B, 8A and 8B involve a control system causing the display 610 to move a specific image in specific directions. However, in some implementations the control system may be capable of causing the display 610 to move any type of image in any direction.

Moreover, the control system may be capable of controlling the mobile device 650 to perform other functions in response to changes in signals received from a fingerprint sensor of the apparatus 101. The fingerprint sensor may or may not be a component of an ultrasonic sensor system, depending on the particular implementation. In some implementations, a control system of the apparatus 101 and/or of the mobile device 650 may be configured for determining a finger action according to detected changes of a finger force (e.g. a normal force and/or shear force), a direction of force, or a detected rate of finger force and/or direction change. The finger action may, for example, include one or more low-force touches, an increasing finger touch force, a finger lift, a finger tilt, a finger rotation and/or a series of alternating low-force and high-force finger exertions.

Different finger actions and/or combinations of finger actions may correspond with different instructions for controlling the mobile device 650 and/or controlling a software application that is being executed by a control system of the mobile device 650. For example, a detected hard/higher-force finger press may be an instruction to confirm a financial transaction. In some examples, a detected light/lower-force finger press may be an instruction to preview a message before opening it. Additional information, such as the magnitude and duration of a normal force, the magnitude, direction and duration of a shear force, the magnitude, direction and duration of an applied finger torque, the time duration of the finger presses and/or the number of finger presses may be used to allow additional types of user actions to be detected and may be interpreted as instructions for various types of functionality.

Calibration parameters for determining different finger actions and/or combinations of finger actions on a platen of a fingerprint sensor system may be determined at a factory during testing and assembling of the ultrasonic sensor system. The calibration parameters may be based on image information acquired from the fingerprint sensor system during a set of time-ordered scans of a finger as part of a factory calibration procedure. The factory-set calibration parameters for determining finger actions may be based on the application and movement of a calibration test target and the calibration parameters may be stored in a memory of the fingerprint sensor system. In some implementations, the factory-set calibration parameters may be pre-determined statistically from a variety of different user inputs without applying a calibration procedure to each individual fingerprint sensor system. In some implementations, the factory-set calibration parameters may be updated with user inputs from a specific user, such as a user who has been authenticated to use the device containing the fingerprint sensor system. In some implementations, a user may be directed during an enrollment procedure to perform predefined actions such as applying varying levels of normal force, sliding a finger over the platen in various directions, and exerting a finger in various directions without sliding the finger to generate varying levels of shear force. In some implementations, the calibration parameters may be adaptively updated to accommodate a particular user's finger and motion characteristics.

Figure 10A:
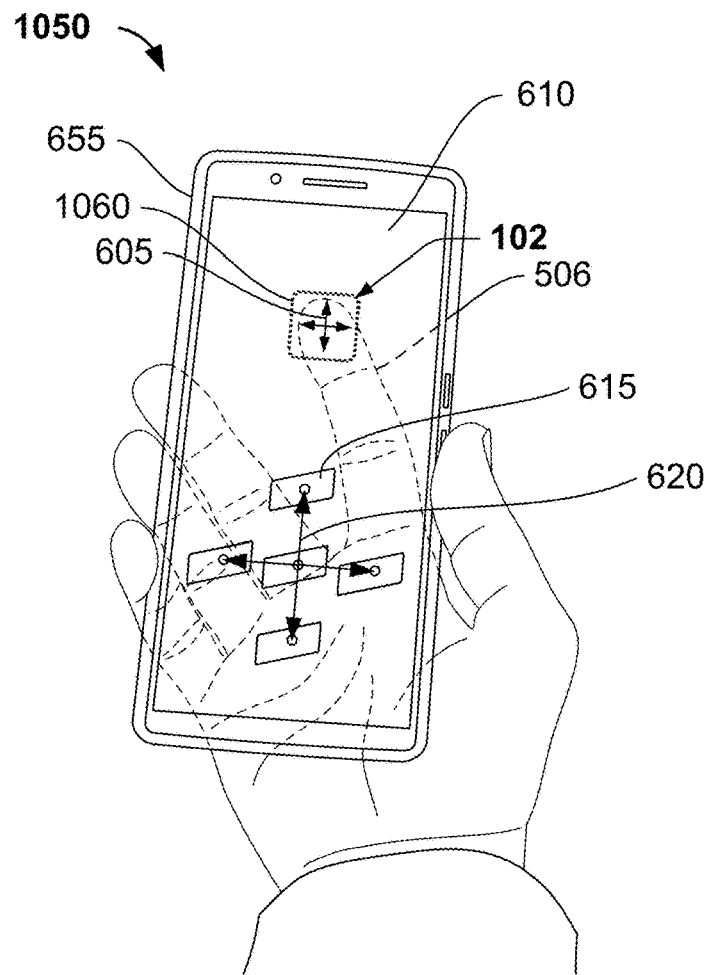
FIG. 10A illustrates an example of a mobile display device with a fingerprint.
Figure 10B:
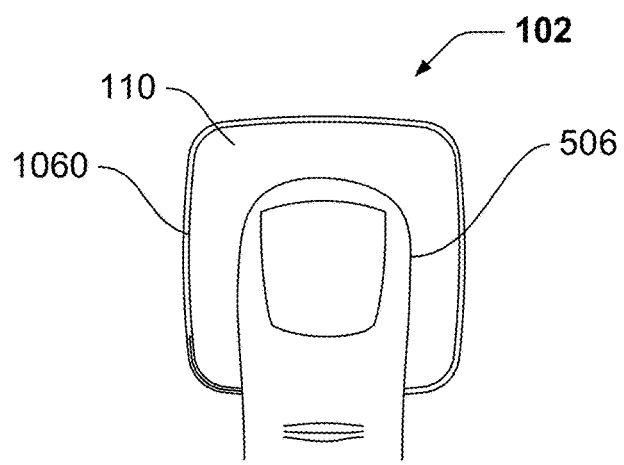
FIG. 10B illustrates a tip of a finger positioned on an outer surface of the fingerprint sensor.

FIG. 10A illustrates an example of a mobile display device 1050 with a fingerprint sensor. In this example, the fingerprint sensor 1060 is a component of the ultrasonic sensor system 102, whereas in other examples the fingerprint sensor 1060 may be, or may be a portion of, another type of fingerprint sensor system, such as an optical fingerprint sensor system, a capacitive fingerprint sensor system, a radio frequency fingerprint sensor system, a thermal fingerprint sensor system, etc. The implementation shown in FIG. 10A includes a backside-mounted multi-functional ultrasonic fingerprint sensor 1060 for authentication and navigation among other functions. In some implementations, the fingerprint sensor 1060 may be attached to a backside wall of the display device 1050. In some implementations, the fingerprint sensor 1060 may be positioned securely against an opening formed in the backside wall of a mobile device enclosure 655. The backside-mounted fingerprint sensor 1060 allows a target object such as a finger 506 of a user to be positioned on a surface of the fingerprint sensor 1060. FIG. 10B illustrates a tip of a finger 506 positioned on an outer surface of a platen 110 of the fingerprint sensor 1060.

In many instances, a user may operate the display device 1050 with a single hand including holding the display device 1050 without obstructing or otherwise obscuring the display 610 from viewing by a user. In some implementations, the user may walk, run or perform other bodily functions without requiring the use of two hands to operate the display device 1050. In some implementations, a fingerprint sensor 1060 positioned on the backside of the enclosure 655 may be augmented with a second fingerprint sensor (not shown) that is accessible from the front (e.g. display side) of the display device 1050 for increased convenience and functionality. In some such implementations, a two-sided authentication process may be performed wherein a first finger of a user is authenticated using a first fingerprint sensor 1060 on the backside of the enclosure 655 and a second finger of the user is authenticated using a second fingerprint sensor that is accessible from the front of the display device 1050, and wherein the two fingers of the user are authenticated sequentially or simultaneously. As used herein, the term "finger" can refer to any digit, including a thumb. Therefore, in some examples the first finger or the second finger may be a thumb. Movements of a finger against a surface of the fingerprint sensor 1060 on either the front side or backside of display device 1050 may be used, for example, to initiate a device wake-up process, authenticate a user, unlock a device, provide a navigational input, select a menu item, start an application, emulate a click or a double-click, move a cursor or pointer, detect a gesture of a user such as a swipe, a flick or a swirl, interact with a browser application, operate a game, change a brightness or volume, consummate a transaction, initiate a call, operate a camera, or perform another function as described in more detail below with respect to FIGS. 11 through 17. For example, a control system of the display device 1050 may be configured to recognize data received from the fingerprint sensor 1060 as corresponding to patterns that indicate such finger movements and/or finger distortions that correspond with finger exertions. The control system may be configured to cause the display device 1050 to perform one or more of the foregoing functions, or one or more of the functions described below with reference to FIGS. 11 through 17, in response to the indication(s) of such finger movements and/or exertions.

Movements, motions, shear forces and/or normal forces generated by the finger 506 positioned on the platen 110 of the fingerprint sensor 1060 in a direction of arrow 605 may be detected by the fingerprint sensor 1060. A control system of the display device 1050 may be configured with the display 610 to cause corresponding movements of an object 615 in the direction indicated by arrow 620 such as a movement of an icon, cursor or pointer on a display 610 of the display device 1050. Forces and sequences of forces may be interpreted by a control system of the display device 1050 to navigate, generate one or more mouse functions, cause a screen response, select an application, initiate a function, or otherwise perform a function, some of which are described in more detail below with respect to FIGS. 11 through 17.

Accordingly, some mobile device implementations may include a first fingerprint sensor residing on a first side of the mobile device and a display residing on a second side of the mobile device, the second side being opposite from the first side. The first side may be a back side and the second side may be a front side. The fingerprint sensor may include a platen. The mobile device may include a control system configured for communication with the fingerprint sensor and the display. The control system may be further configured for receiving fingerprint sensor signals from the fingerprint sensor corresponding to a finger positioned on a fingerprint contact area of the platen, for detecting one or more finger distortions corresponding to changes of the fingerprint sensor signals and for controlling the mobile device based, at least in part, on the distortions. In some implementations, the control system may be configured for detecting a change of the fingerprint contact area and for controlling the mobile device based, at least in part, on the distortions the detected change of the fingerprint contact area.

Figure 11:
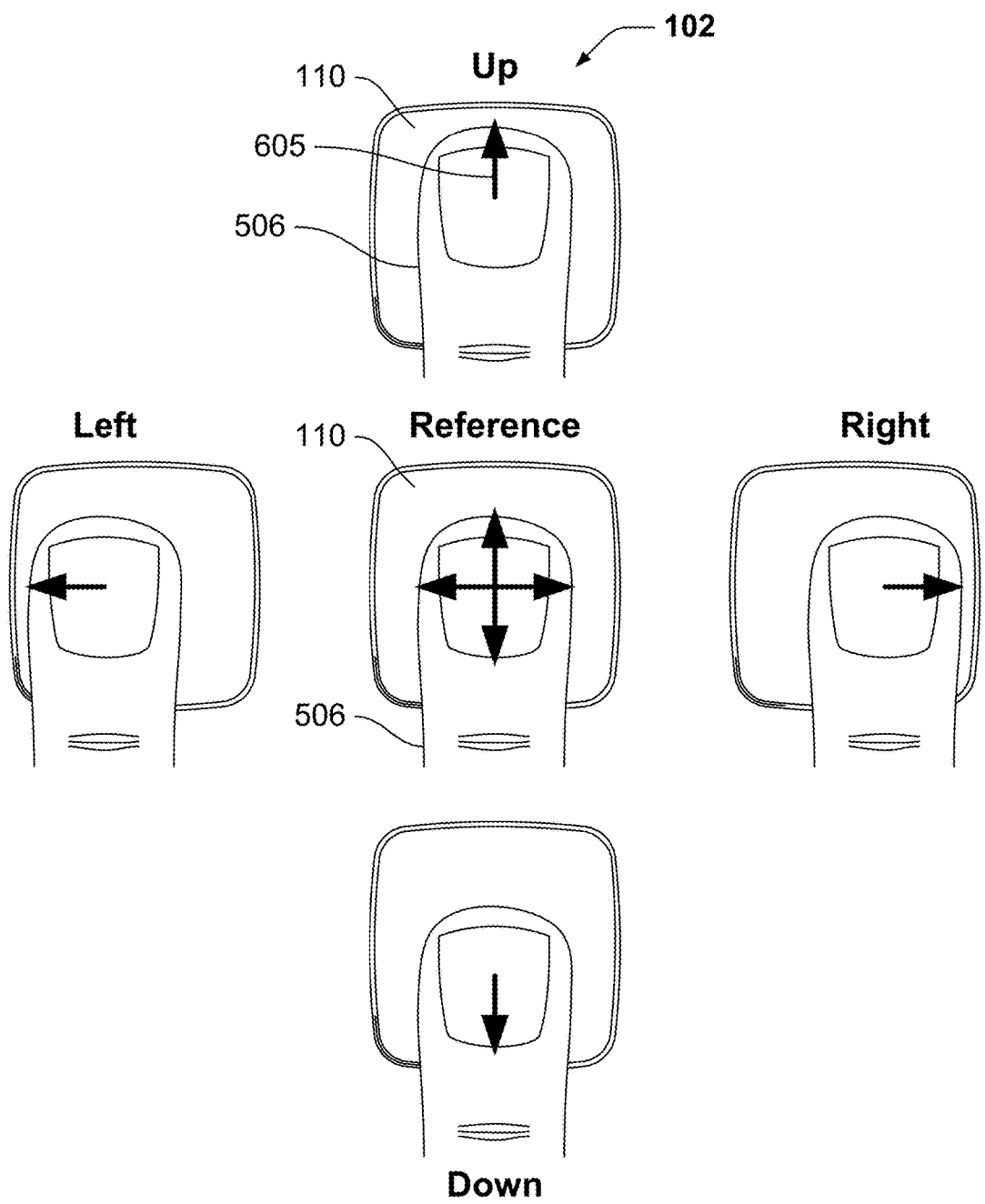
FIG. 11 shows illustrative images that represent translational movements of a finger on a platen of a fingerprint sensor and corresponding navigational inputs.

FIG. 11 shows illustrative images that represent translational movements 605 of a finger 506 on a platen 110 of a fingerprint sensor and corresponding navigational inputs. In this example, the fingerprint sensor is a component of an ultrasonic sensor system 102, whereas in other examples the fingerprint sensor may be, or may be a portion of, another type of fingerprint sensor system. A reference position of the finger 506 may correspond with the initial placement of the finger 506 on the platen 110. Directions corresponding to up, down, left, right and combinations thereof may correspond to translational movements of the finger 506 on the platen 110, such as may occur when a dry finger or a lightly pressed finger is slid along a surface of the platen 110.

Figure 12:
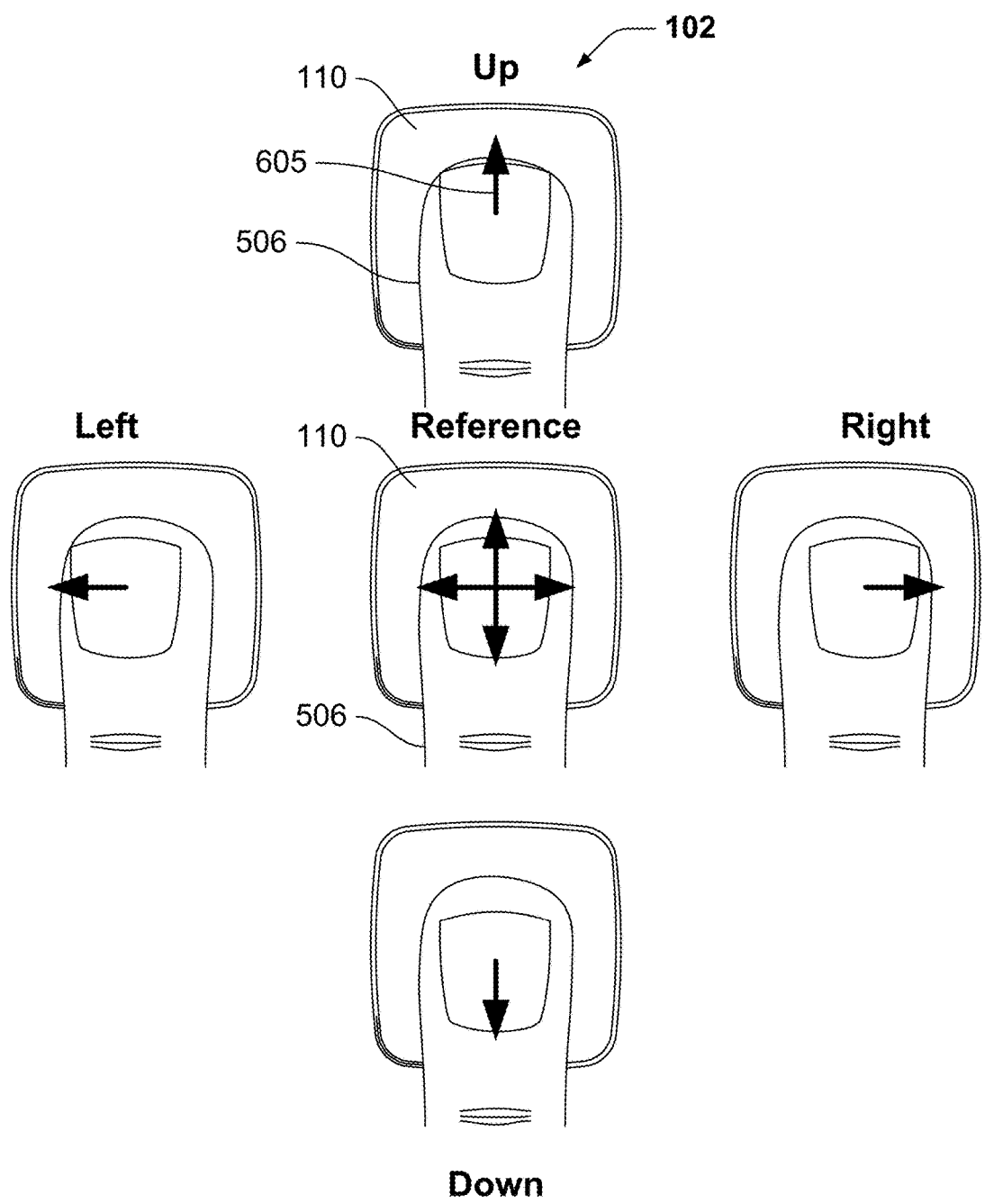
FIG. 12 shows illustrative images representing exertions of a finger that generate shear forces on a platen of a fingerprint sensor and corresponding navigational inputs.

In contrast, FIG. 12 shows illustrative images that represent exertions of a finger 506 that generate shear forces on the platen 110 of a fingerprint sensor and corresponding navigational inputs without the finger 506 sliding on a surface of the platen 110. In this example, the fingerprint sensor is a component of an ultrasonic sensor system 102, whereas in other examples the fingerprint sensor may be, or may be a portion of, another type of fingerprint sensor system. As in FIG. 11, a reference position of the finger 506 may correspond with the initial placement of the finger 506 on the platen 110. Directions corresponding to the direction of arrow 605 such as up, down, left, right and combinations thereof may correspond to exertions of the finger 506 against the platen 110, such as may occur when a finger is heavily pressed against a surface of the platen 110 and where the finger 506 fails to slide along the surface of the platen 110, yet deforms in response to the lateral physical exertions caused by muscles of the hand and fingers that in turn may be detected and interpreted by the ultrasonic sensor system 102.

Figure 13:
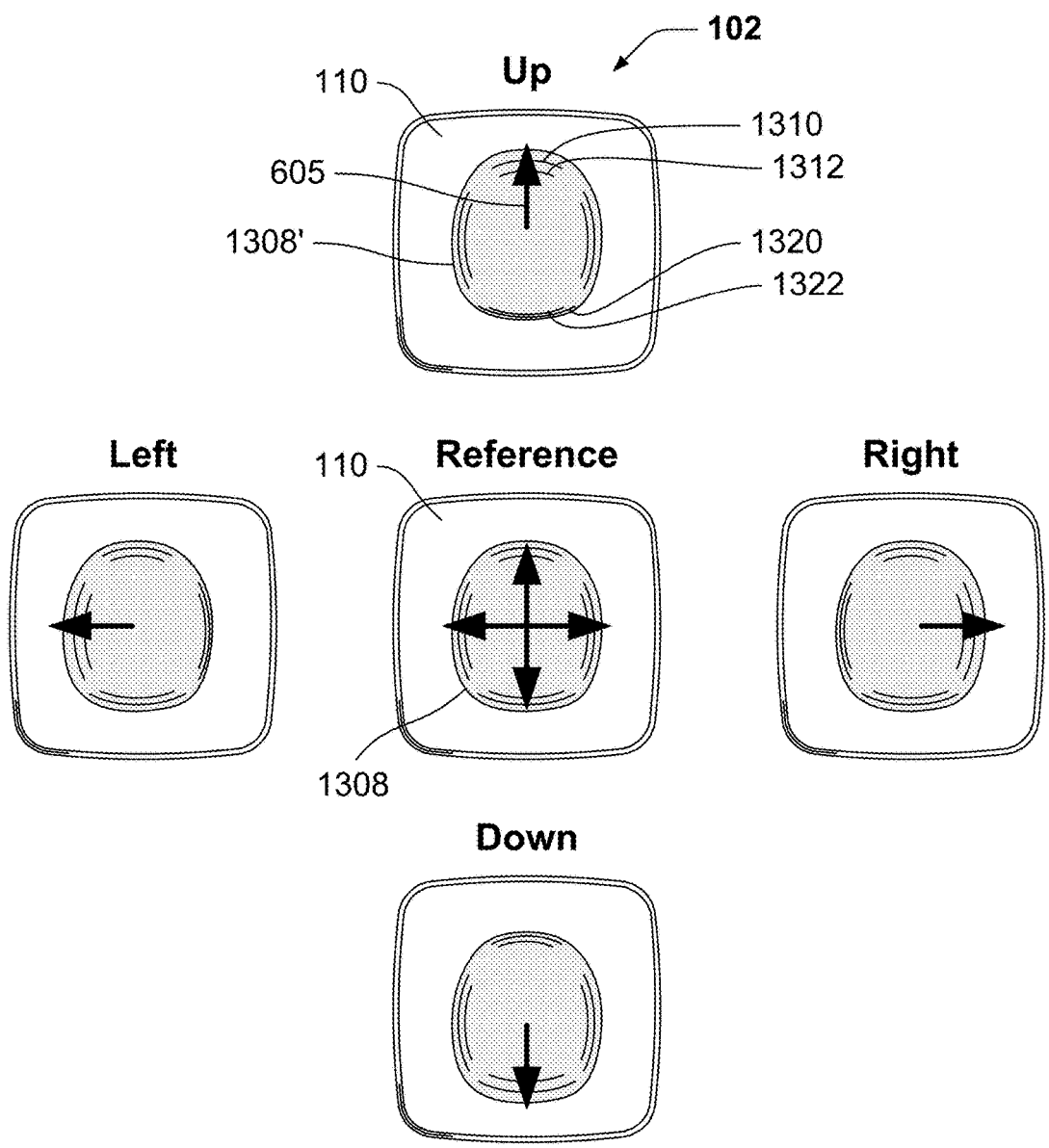
FIG. 13 shows illustrative images that represent compressions and expansions of fingerprint ridge spacings resulting from shear forces generated by exertions of a finger on a platen of a fingerprint sensor and corresponding navigational inputs.

As normal finger forces generally cause the contact area of the fingerprint to change, distortions of the fingerprint ridges and valleys along with changes in contact area geometry generally occur with the generation of shear forces induced by exertions of the finger laterally against the platen surface. FIG. 13 shows illustrative images that represent compressions and expansions of fingerprint ridge spacings that result from shear forces generated by exertions of a finger on a platen 110 of a fingerprint sensor and corresponding navigational inputs. These changes in fingerprint ridge spacings are further examples of what may be referred to herein as finger distortions. In this example, the fingerprint sensor is a component of an ultrasonic sensor system 102. A reference position of the finger may correspond with the initial placement of the finger on the platen 110 that generates a fingerprint contact area 1308 and associated contact area geometry. Directions corresponding to up, down, left, right and combinations thereof may correspond to movement of the fingerprint contact area 1308' in the direction of the arrow 605 or other directions due to exertions of the finger against the platen 110 where the finger fails to slide or partially slides along the surface of the platen 110, causing distortions of the spacings between adjacent fingerprint ridges and changes to the fingerprint contact area 1308 and associated geometry. In the example illustrated, fingerprint ridges 1310 and 1312 near the leading edge of the fingerprint contact area 1308' are expanded with an increased fingerprint ridge spacing, whereas fingerprint ridges 1320 and 1322 near the trailing edge of the fingerprint contact area 1308' are compressed with a decreased fingerprint ridge spacing. Fingerprint ridges in other portions of the fingerprint contact area 1308' such as those near the center of the contact area may experience little if any distortion or displacement with lateral exertions of the finger while the finger continues to stay in contact with the platen 110 without sliding. The fingerprint valley regions may exhibit similar responses as the fingerprint ridges.

In some implementations, a navigational input may be determined by computing a spatial frequency along a set of line segments that are perpendicular to the periphery of a fingerprint contact area. An elevated spatial frequency may correspond with a compressed set of fingerprint ridges, and a decreased spatial frequency may correspond with an expanded set of fingerprint ridges. For example, spatial frequencies may be determined along one, two, three, four or more line segments that are near the periphery of the fingerprint contact area and the determined spatial frequencies may be compared to previously-determined spatial frequencies from an earlier point in time to determine the direction and magnitude of a navigational input. Alternatively, spatial frequencies on one side of a finger contact area may be compared to one or more spatial frequencies on an opposite side of the finger contact area, and the difference in the spatial frequencies may indicate a navigational input. For example, spatial frequencies on the left side of a finger contact area may be increased while spatial frequencies on the right side of the finger contact area may be decreased, with the difference indicating a compressed ridge spacing on the left side and an expanded ridge spacing on the right side that corresponds with a direction of the navigational input to the right. The magnitude of the difference may indicate the magnitude of the navigational input.

In some implementations, a measure of the shear force may be determined by measuring a change in the spacing between sweat pores or other fingerprint features, particularly those near the periphery of the fingerprint contact area, from which a magnitude and direction of a navigational input may be determined. Fingerprint features that are near the periphery of the fingerprint contact area may be referred to as being in a peripheral region of the fingerprint contact area. For example, an upwardly exerted finger may have stretched fingerprint features near the leading edge of the fingerprint contact area and compressed fingerprint features near the trailing edge of the fingerprint contact area, from which the direction and magnitude of the navigational input maybe determined.

Figure 14:
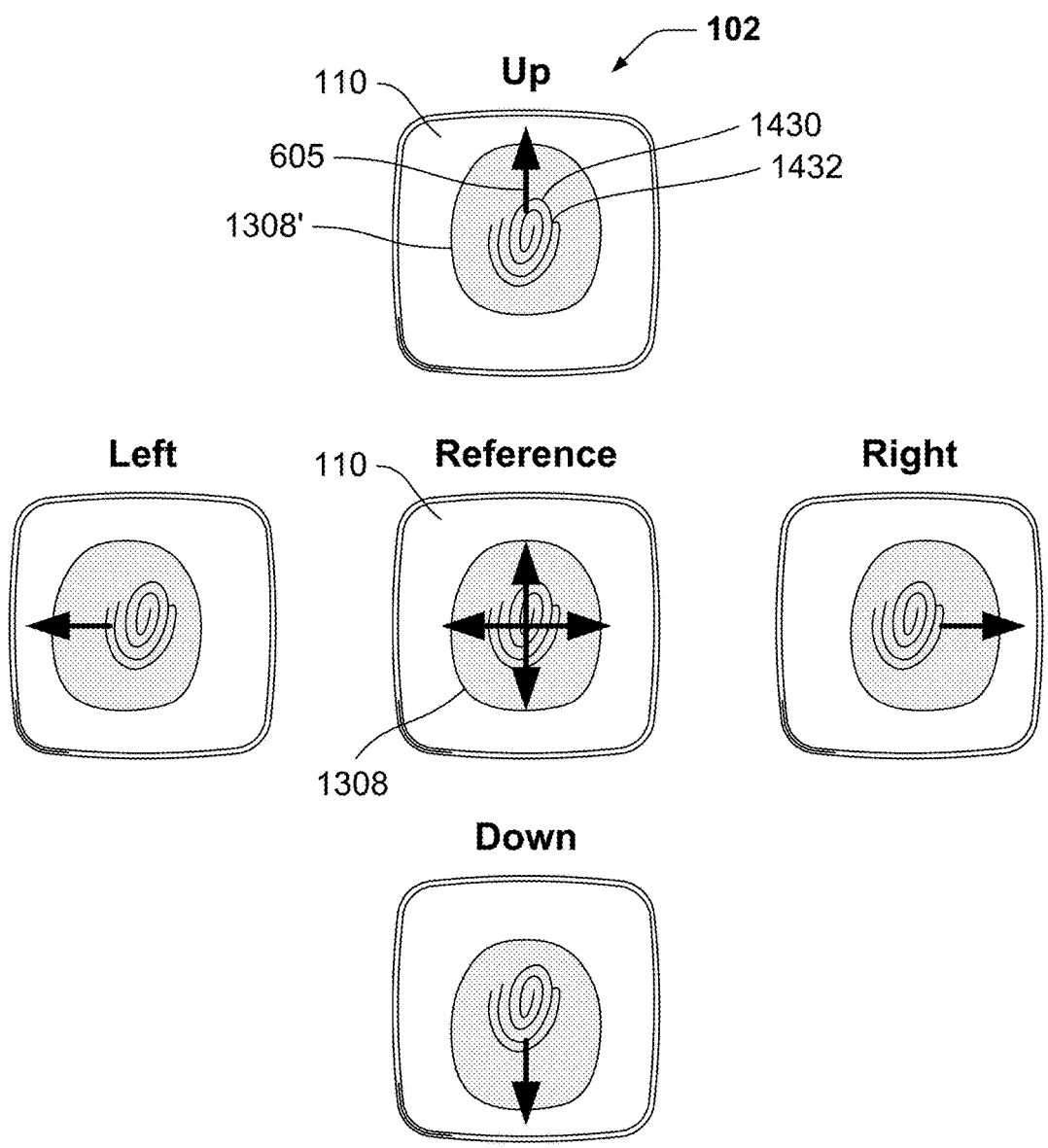
FIG. 14 shows illustrative images that represent movement of a fingerprint contact area with respect to one or more fingerprint features resulting from shear forces generated by exertions of a finger on a platen of a fingerprint sensor and corresponding navigational inputs.

FIG. 14 shows illustrative images that represent movement of a fingerprint contact area 1308 with respect to one or more fingerprint features 1430, 1432 resulting from shear forces generated by exertions of a finger on a platen 110 of the fingerprint sensor and corresponding navigational inputs. In this example, the fingerprint sensor is a component of an ultrasonic sensor system 102, whereas in other examples the fingerprint sensor may be, or may be a portion of, another type of fingerprint sensor system. Fingerprint features 1430, 1432 may correspond, for example, to a fingerprint whorl and a bifurcation point, respectively, in a fingerprint image. A reference position of the finger may correspond with the initial placement of the finger on the platen 110 that generates a fingerprint contact area 1308 and associated contact area geometry. Directions corresponding to up, down, left, right and combinations thereof may correspond to movement of the fingerprint contact area 1308' in the direction of the arrow 605 or other directions due to exertions of the finger against the platen 110 where the finger fails to slide along the surface of the platen 110, causing changes to the fingerprint contact area 1308 and associated geometry including distances between the periphery of the fingerprint contact area 1308 and the fingerprint features 1430, 1432. In some implementations, determination of the distances between the periphery of the fingerprint contact area 1308 and fingerprint features 1430, 1432 in one or more directions may indicate a navigation function in a preferred direction to be performed.

Figure 15:
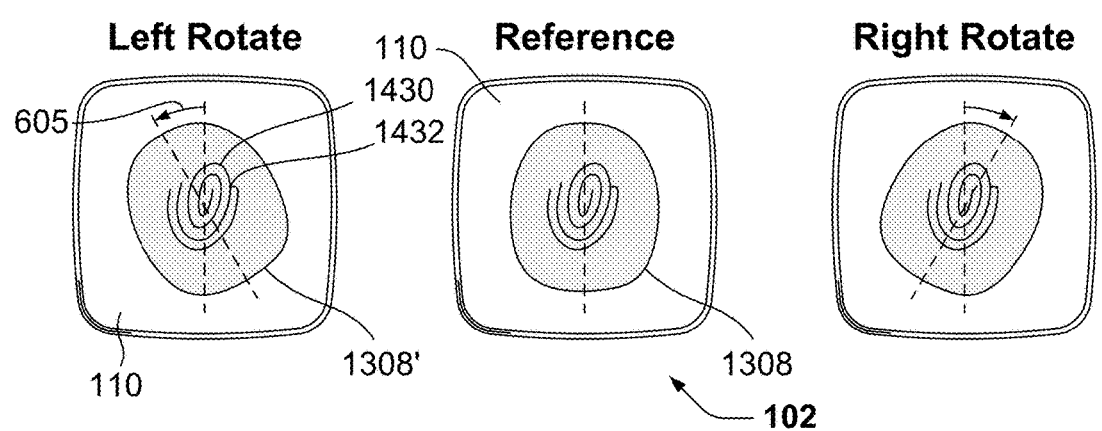
FIG. 15 shows illustrative images that represent rotational movement of a fingerprint contact area with respect to one or more fingerprint features resulting from torsional forces generated by exertions of a finger on a platen of a fingerprint sensor and corresponding navigational inputs.

According to some examples, rotational movements of a finger may be detected using the multi-functional ultrasonic fingerprint sensor. FIG. 15 shows illustrative images that represent rotational movement of a fingerprint contact area 1308 with respect to one or more fingerprint features 1430, 1432 resulting from torsional forces generated by exertions of a finger on a platen 110 of a fingerprint sensor and corresponding navigational inputs. In this example, the fingerprint sensor is a component of an ultrasonic sensor system 102, whereas in other examples the fingerprint sensor may be, or may be a portion of, another type of fingerprint sensor system. In some implementations, rotations clockwise or counterclockwise may be determined by acquiring fingerprint images from the fingerprint sensor, determining the size and shape of a periphery of a reference fingerprint contact area 1308, then acquiring additional fingerprint images from the fingerprint sensor and determining the size and shape of the updated fingerprint contact area 1308' to allow determination of the direction of rotation and the angle of rotation. In the implementation illustrated, fingerprint features 1430, 1432 stay fixed (or substantially fixed) in position on the platen 110 while the finger is exerted in a twisting, angular motion in the direction of arrow 605 on the platen 110 without sliding or slipping of the fingerprint features 1430, 1432. Other fingerprint features such as ridges, valleys and minutiae near the periphery of the updated fingerprint contact area 1308' may be analyzed for distortions due to shear stress to determine the desired rotation direction and rotation magnitude. Determination of rotational motions of the finger may allow initiating or performing functions such as zoom in, zoom out, increase or decrease volume, or switch from portrait to landscape view or from landscape to portrait view on a display.

Figure 16:
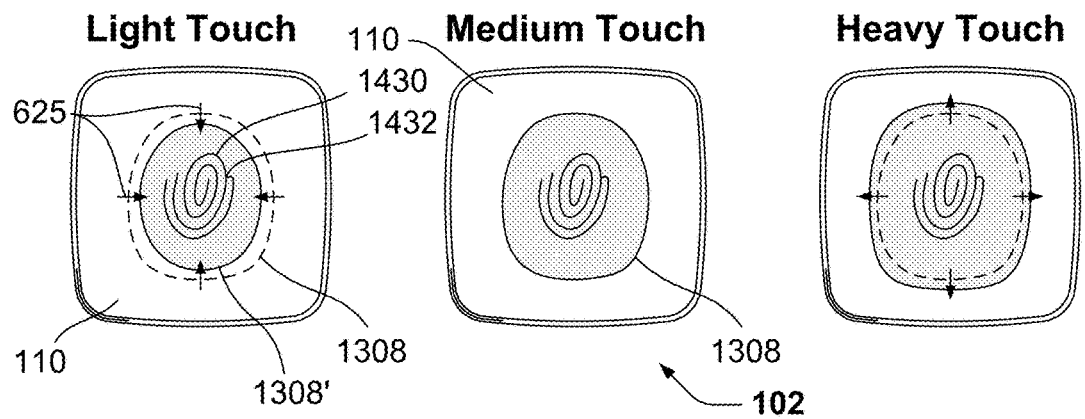
FIG. 16 shows illustrative images that represent changing fingerprint contact area with respect to one or more fingerprint features resulting from changing normal forces generated by exertions of a finger on a platen of a fingerprint sensor and corresponding navigational inputs.

Traditional mouse functions such as cursor or pointer navigation, clicking, double-clicking, right-clicking, left-clicking and selecting may be determined from the multi-functional fingerprint sensor described above. FIG. 16 shows illustrative images that represent changing fingerprint contact area 1308 with respect to one or more fingerprint features 1430, 1432 resulting from normal forces generated by exertions of a finger on a platen 110 of a fingerprint sensor and corresponding navigational inputs. In this example, the fingerprint sensor is a component of an ultrasonic sensor system 102, whereas in other examples the fingerprint sensor may be, or may be a portion of, another type of fingerprint sensor system. The magnitude of the normal force may be determined by acquiring fingerprint images from the fingerprint sensor, determining the size and shape of the fingerprint contact area 1308, and then correlating the contact area to the applied force. In the implementation illustrated, fingerprint features 1430, 1432 stay fixed in position on the platen 110 while the finger is pressed with varying levels of normal forced in a direction perpendicular to the surface of the platen 110, causing the fingerprint contact area 1308' to enlarge or decrease in the directions of arrows 625 without sliding or slipping of the fingerprint features 1430, 1432 or lifting of the finger from the plate surface. Other fingerprint features such as ridges and valleys near the periphery of the updated fingerprint contact area 1308' may be analyzed for distortions due to shear stress to aid in determining the magnitude of the applied normal force.

Figure 17:
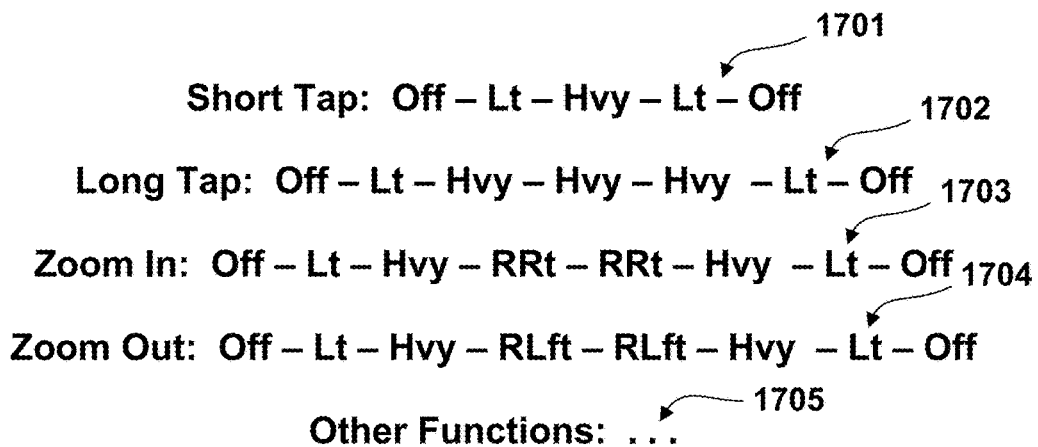
FIG. 17 shows representative sequences of forces and motions of a finger positioned on a platen of a fingerprint sensor that may be translated into predetermined commands for initiating and performing various functions.

FIG. 17 shows representative sequences of forces and motions of a finger positioned on a platen of a fingerprint sensor that may be translated into predetermined commands for initiating or performing various functions. For example, fingerprint sequence 1701 emulating a short tap (e.g. a "click") may be determined from the sequence of finger off, light press, heavy press, light press and finger off in relatively quick succession. Similarly, a fingerprint sequence emulating a double tap (e.g. a "double-click") may be determined from the sequence of finger off, light press, heavy press, light press, heavy press, light press and finger off in relatively quick succession. In another example, fingerprint sequence 1702 emulating a long tap may be determined from the sequence of finger off, light press, heavy press, several more heavy presses, light press and finger off in somewhat longer succession. In another example, fingerprint sequence 1703 emulating a zoom-in or a volume-increase function may be determined from the sequence of finger off, light press, heavy press, right rotation, another right rotation, heavy press, light press and finger off. In another example, fingerprint sequence 1704 emulating a zoom-out or a volume-decrease function may be determined from the sequence of finger off, light press, heavy press, left rotation, another left rotation, heavy press, light press and finger off. Other functions may be initiated or performed from other fingerprint sequences 1705, such as a user log-in function, a wake-up request, a kinesthetic password entry, a menu selection input or a user preference indication. Fingerprint sequences may include a series of one or more motions with the finger remaining in a non-slipping or non-sliding mode on the platen surface, a series of one or more motions with the finger operating in a slip or slide mode, a series of motions separated by a finger lift where the finger of a user is temporarily removed from the platen surface, or a combination thereof.

Figure 18:
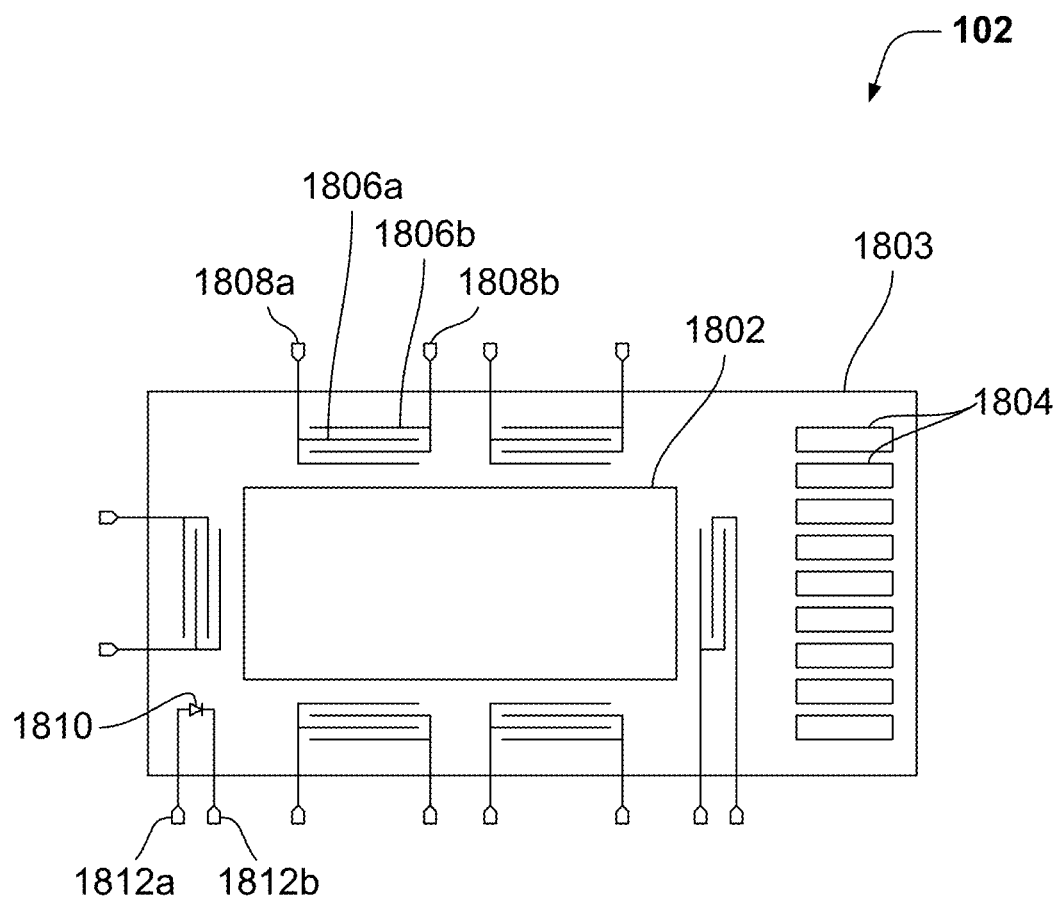
FIG. 18 illustrates an augmented ultrasonic sensor array of an ultrasonic sensor system that includes one or more capacitive sense electrodes and temperature sensing devices for detecting finger position, finger proximity, finger hydration, finger temperature and/or finger motion.

FIG. 18 illustrates an augmented ultrasonic sensor array 1803 of an ultrasonic sensor system 102 that includes an active ultrasonic fingerprint sensing area 1802 of the ultrasonic sensor array 1803, a set of connective electrical pads 1804, and one or more capacitive sense electrodes 1806a, 1806b for detecting finger position, finger proximity, finger hydration and/or finger motion. The capacitive sense electrodes 1806a, 1806b may include one or more interdigitated electrodes that may be electrically connected to on-chip or off-chip electronic circuitry via one or more electrical connections 1808a, 1808b. One or more capacitive sense electrodes 1806a, 1806b may be used for bioimpedance measurements, such as determination of a capacitive and/or a resistive component of a finger or other body part at a predetermined frequency. In some implementations, capacitive sense electrodes 1806a may be activated with one or more sensor excitation frequencies and the electrical response such as coupling coefficients, output signal amplitudes and/or phase delays may be determined from signals picked up on nearby capacitive sense electrodes 1806b. Finger hydration, for example, may impact the effective dielectric permittivity when the finger is positioned near the capacitive sense electrodes 1806a, 1806b. The effective dielectric permittivity may be compared to a reference dielectric permittivity, and the comparison may be used as a basis for determining finger hydration. Use of a plurality of different sensor excitation frequencies allows a spectrum of effective dielectric permittivities to be determined over a range of frequencies, from which a finger hydration level, a finger oiliness level, a finger dryness and other property levels such as skin elasticity, skin dryness and skin moisture may be determined. Bioimpedance measurements obtained from one or more capacitive sense electrodes 1806a, 1806b may augment, supplant or be fused with ultrasonic output signal measurements such as those described above. Similarly, ultrasonic output signal measurements such as those described above may augment, supplant or be fused with bioimpedance measurements obtained from one or more capacitive sense electrodes 1806a, 1806b. The bioimpedance measurements may be augmented with the ultrasonic measurements to obtain more accurate values of finger properties such as finger hydration or finger oiliness. In some implementations, a bioimpedance indicator may supplant or replace an ultrasonically measured finger attribute. In some implementations, the ultrasonic measurements may be fused or algorithmically combined with the bioimpedance measurements to increase the measurement accuracy and/or extend the range of the finger property. For example, a bioimpedance measurement using one or more capacitive sense electrodes 1806a, 1806b may be combined with one or more acoustic impedance measurements from ridge regions and valley regions of a finger or another body part to obtain a composite measurement that indicates a skin condition such as skin elasticity. In some implementations, finger or skin elasticity may be determined from the slope of the fingerprint contact area with a change in finger pressure. With two or more time-sequenced ultrasonic images, the total fingerprint contact area of a finger positioned against the platen surface may be ascertained by determining a set of bounding boxes that include both fingerprint ridge features and fingerprint valley features, then determining the composite area of the set of bounding boxes. The aggregate ridge area and the aggregate valley area within the fingerprint contact area may be determined. The ratio of aggregate ridge area to the total fingerprint contact area provides a measure of the applied finger pressure. In some implementations, the delta output signal (e.g., R2–R1) averaged throughout the fingerprint contact area may provide the measure of applied finger pressure. Additionally, the delta output signal (e.g., R2–R1) of one or more sensor pixels that are located in one or more fingerprint ridge regions provides a measure of the acoustic impedance of the finger ridges. A measure of skin elasticity may be determined by dividing the delta output signal in one or more ridge regions by the ratio of the aggregate ridge area to the overall fingerprint contact area. In some implementations, the skin elasticity may be determined by dividing the delta output signal in one or more ridge regions by the delta output signal in the fingerprint contact area. The skin elasticity in turn may be determined from the calculated slope by including appropriate calibration and unit conversion multipliers. The ultrasonic fingerprint sensor may be used with other portions of the body for determining skin hydration, skin oiliness, skin elasticity or other skin conditions of the other body portions, such as placing the platen of the ultrasonic fingerprint sensor against a portion of the face, neck, arm or leg.

Finger temperature or the temperature of a target object positioned on or near the ultrasonic sensor array 1803 may be determined from a temperature sensing device 1810 such as a resistive temperature device, a semiconductor device such as a reverse-biased diode, or a thermocouple. The temperature sensing device 1810 may be electrically connected to on-chip or off-chip electronic circuitry via electrical connections 1812a, 1812b. Multi-functional ultrasonic fingerprint sensors may combine one or more sensor types along with ultrasonic imaging capabilities to determine biometric and health attributes of a user, such as in a medical diagnostic device, an activity monitor, or a multi-functional sports watch.

In some implementations, one or more biometric indicators generated from bioimpedance measurements using one or more capacitive sense electrodes 1806a, 1806b of the augmented ultrasonic sensor array 1803 may be combined with the results of a user authentication process using data received from the ultrasonic sensor array 1803 to provide two-factor or multi-factor authentication of a user. Biometric indicators generated from the bioimpedance measurements may include a moisture level of a finger of an authorized user. Some implementations may generate biometric indicators based on a finger hydration level, a finger oiliness level, a finger dryness level, a skin elasticity level or other finger property level. A biometric indicator may be affirmed if the biometric indicator lies above a predetermined lower biometric threshold, below a predetermined upper biometric threshold, or within a predetermined biometric range. In some implementations, the predetermined biometric thresholds and/or ranges may be determined from a population of test subjects and stored as one or more calibration parameters at a factory during testing and assembling of the fingerprint sensor system. In some implementations, the biometric thresholds and/or ranges may be determined from an enrolled finger of an authorized user during an enrollment procedure with the authorized user's finger. In some implementations, the biometric thresholds and/or ranges may be stored with other fingerprint and/or attribute information in one or more enrollment templates for later use in a user authentication or validation process.

A liveness indicator may be determined from one or more biometric indicators generated from the bioimpedance measurements. The liveness indicator may be combined with the results of a user authentication or validation process to provide a higher level of confidence in the authentication/validation result. The status of the liveness indicator may be provided to the proposed user of a mobile device, particularly if the status of the liveness indicator is false (indicating that a target object is not alive), negative or non-affirmed. In some implementations, the status of the liveness indicator may be provided to an authorized user or to a network-connected device, and/or stored for later conveyance to the authorized user, the network-connected device, or to the authorities. In some implementations, the liveness indicator may be based on a moisture content of a target object such as a finger placed on a platen of the fingerprint sensor system. In some implementations, the liveness indicator may be based on a finger hydration level, a finger oiliness level, a finger dryness level, a skin elasticity level, a finger hydration-to-oiliness ratio, a finger hydration-to-oiliness correlation, or other finger property level or ratio of property levels. In some implementations, the basis for the liveness indicator may include one or more minimum threshold values, one or more maximum threshold values, or one or more biometric ranges.

Bioimpedance measurements from the one or more capacitive sense electrodes 1806a, 1806b of the augmented ultrasonic sensor array 1803 may provide algorithmic improvements to fingerprint data as part of an authentication process. The authentication process may involve obtaining (e.g., via a control system) current fingerprint data and comparing the current fingerprint data with stored fingerprint data of an enrolled user. The fingerprint data may be derived from fingerprint sensor signals, which in some implementations may include ultrasonic sensor signals. According to some examples, the fingerprint data may include keypoints, fingerprint minutiae and/or fingerprint ridge flow patterns. For example, during different times of the day, a user's finger may be drier than at other times. In more severe situations, finger dryness may result in discontinuous sections of a fingerprint ridge that may normally be connected during normal finger hydration levels such as after washing hands with soap or exposure to alcohol-based disinfectant wipes. In some cases, a user's finger may exhibit a larger number of islands, segmented ridges or discontinuous ridges along one or more fingerprint ridge regions during low-hydration periods than during normal moisture-level periods. According to some examples, an authentication process may involve modifying (e.g., via a control system) the current fingerprint data according to bioimpedance measurements, to produce modified current fingerprint data, and comparing the modified current fingerprint data with stored fingerprint data of an enrolled user. Alternatively, or additionally, in some implementations a fingerprint matching process may be adjusted according to bioimpedance measurements. In some implementations, bioimpedance measurements that indicate excessive dryness may allow the fingerprint matching algorithms to adjust various keypoints, fingerprint minutiae or fingerprint ridge flow patterns according to bioimpedance measurements. In some implementations, the threshold values for a fingerprint match may be adjusted for finger dryness and image quality reductions that may occur when an enrolled finger is particularly dry. Variations in finger dryness with seasonal changes and exposure to humid or non-humid environments such as a warm shower or a cold winter day may be accommodated by the fingerprint matching algorithms using the bioimpedance measurements. Tendencies for increased finger dryness with age may also be accommodated. Other biometric indicators generated from bioimpedance measurements such as finger hydration or finger oiliness may impact the image quality or fingerprint features and be accommodated by the fingerprint matching algorithms.

Excessively wet fingers can present difficulties to fingerprint matching algorithms due in part to the softening and enlarging of fingerprint ridges with increased hydration and the possibility of fingerprint valley regions filling in with water. Bioimpedance measurements from one or more capacitive sense electrodes 1806a, 1806b of the ultrasonic sensor array 1803 may be incorporated into the fingerprint matching algorithms and adjustments to fingerprint features or image quality be made accordingly. In a similar manner, excessively oily fingers can present difficulties to fingerprint matching algorithms due in part to the reduction of fingerprint features that may occur with increased exposure to lotions or other oily substances. Bioimpedance measurements may be incorporated into the fingerprint matching algorithms and adjustments made accordingly to fingerprint features or image quality aspects.

Input from the ultrasonic sensor array 1803 may, in some examples, be used (for example, by a control system) to modify, extend the range of, or otherwise augment bioimpedance measurements from the one or more capacitive sense electrodes 1806a, 1806b. For example, the range of hydration and oiliness levels from the bioimpedance measurements may be extended at either the low end or high end of the finger hydration and/or finger oiliness range by incorporating acoustic impedance measurements from the ultrasonic sensor array. For example, a change in acoustic impedance indicates a change in the speed of sound and/or mass density of the fingerprint ridge regions and other regions of the finger that can be correlated to and increase the accuracy of the bioimpedance measurements within a particular range or to enhance the range of valid skin temperature, skin hydration, skin moisture, skin dryness, skin oiliness, skin condition or other skin levels.

In some implementations, determining the contact area of the fingerprint may provide an indication of when a bioimpedance measurement is valid. For example, a sufficiently high fingerprint contact area from the ultrasonic image information may indicate sufficient contact force to obtain an accurate bioimpedance measurement. The contact force determination may be used to provide auditory or visual feedback to a user (e.g., via one or more elements of a user interface system, such as a speaker and/or a display) on whether to press harder on the sensor platen. The contact force determination may be used to determine when to apply a plurality of different sensor excitation frequencies from which hydration level, oiliness level, dryness level and other property levels such as skin elasticity, skin dryness and skin moisture may be determined. In some implementations, the ultrasonic image information may be used to determine that a finger is correctly placed on the sensor and to notify a user accordingly. In some implementations, the ultrasonic image information may be used to indicate a wet-finger condition and correct the finger hydration levels accordingly.

In some implementations, acquired ultrasonic image data may be used to indicate which of one or more capacitive sense electrodes 1806a, 1806b should be used in determination of the bioimpedance indicators. In some implementations, bioimpedance measurements from two or more sets of capacitive sense electrodes 1806a, 1806b may be weighted by the degree in which a finger is positioned over the various capacitive sense electrodes 1806a, 1806b when determining the bioimpedance indicators.

In some implementations, the ultrasonic sensor array may be used to acquire depth-related (such as three-dimensional or 3-D) image data within a finger or other body part. Some examples are described below with reference to FIG. 21. The capacitive sense electrodes 1806a, 1806b may be used to determine levels of finger hydration and other tissue characteristics that allow the extraction of acoustic information such as acoustic attenuation and local speed of sound. The acoustic information may be used in turn to correct, enhance, or otherwise modify the 3-D ultrasonic image data so that signals from deeper portions of a finger may be corrected accordingly for enhanced depth-profiling, 3-D imaging and user authentication.

Figure 19:
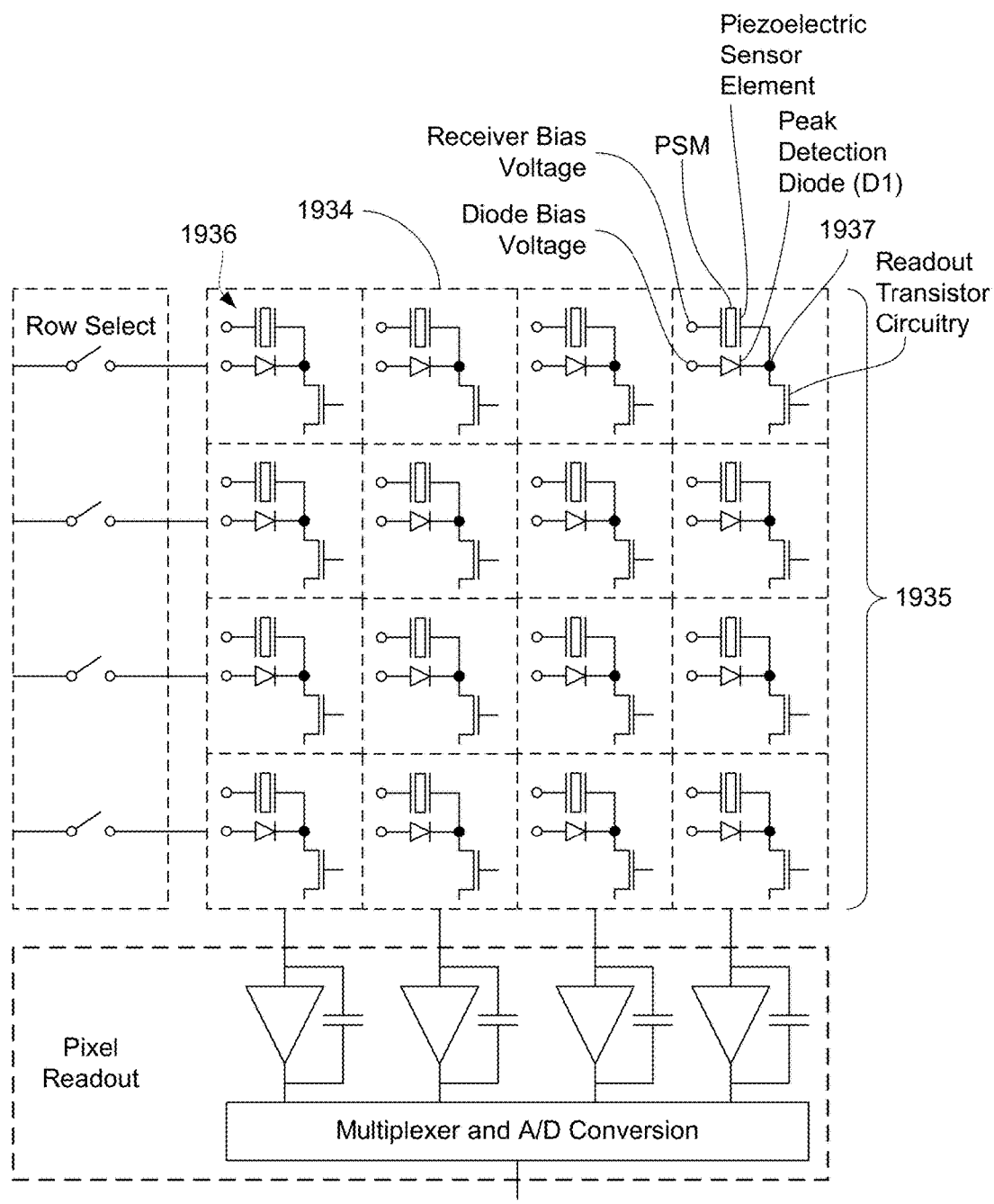
FIG. 19 representationally depicts aspects of a 4×4 pixel array of sensor pixels for an ultrasonic sensor system.

FIG. 19 representationally depicts aspects of a 4×4 pixel array of sensor pixels for an ultrasonic sensor system. Each sensor pixel 1934 may be, for example, associated with a local region of piezoelectric sensor material (PSM), a pixel input electrode 1937, a peak detection diode (D1) and a readout transistor (M3); many or all of these elements may be formed on or in a substrate to form the pixel circuit 1936. In practice, the local region of piezoelectric sensor material of each sensor pixel 1934 may transduce received ultrasonic energy into electrical charges. The peak detection diode D1 may register the maximum amount of charge detected by the local region of piezoelectric sensor material PSM. Each row of the pixel array 1935 may then be scanned, e.g., through a row select mechanism, a gate driver, or a shift register, and the readout transistor M3 for each column may be triggered to allow the magnitude of the peak charge for each sensor pixel 1934 to be read by additional circuitry, e.g., a multiplexer and an A/D converter. The pixel circuit 1936 may include one or more TFTs to allow gating, addressing, and resetting of the sensor pixel 1934.

Each pixel circuit 1936 may provide information about a small portion of the object detected by the ultrasonic sensor system. While, for convenience of illustration, the example shown in FIG. 19 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 8 mm×3 mm, 5 mm×5 mm or 9 mm×4 mm for a single finger to about 3 inches×3 inches for four fingers. Smaller and larger areas, including square, rectangular and non-rectangular geometries, may be used as appropriate for the target object.

Figure 20A:
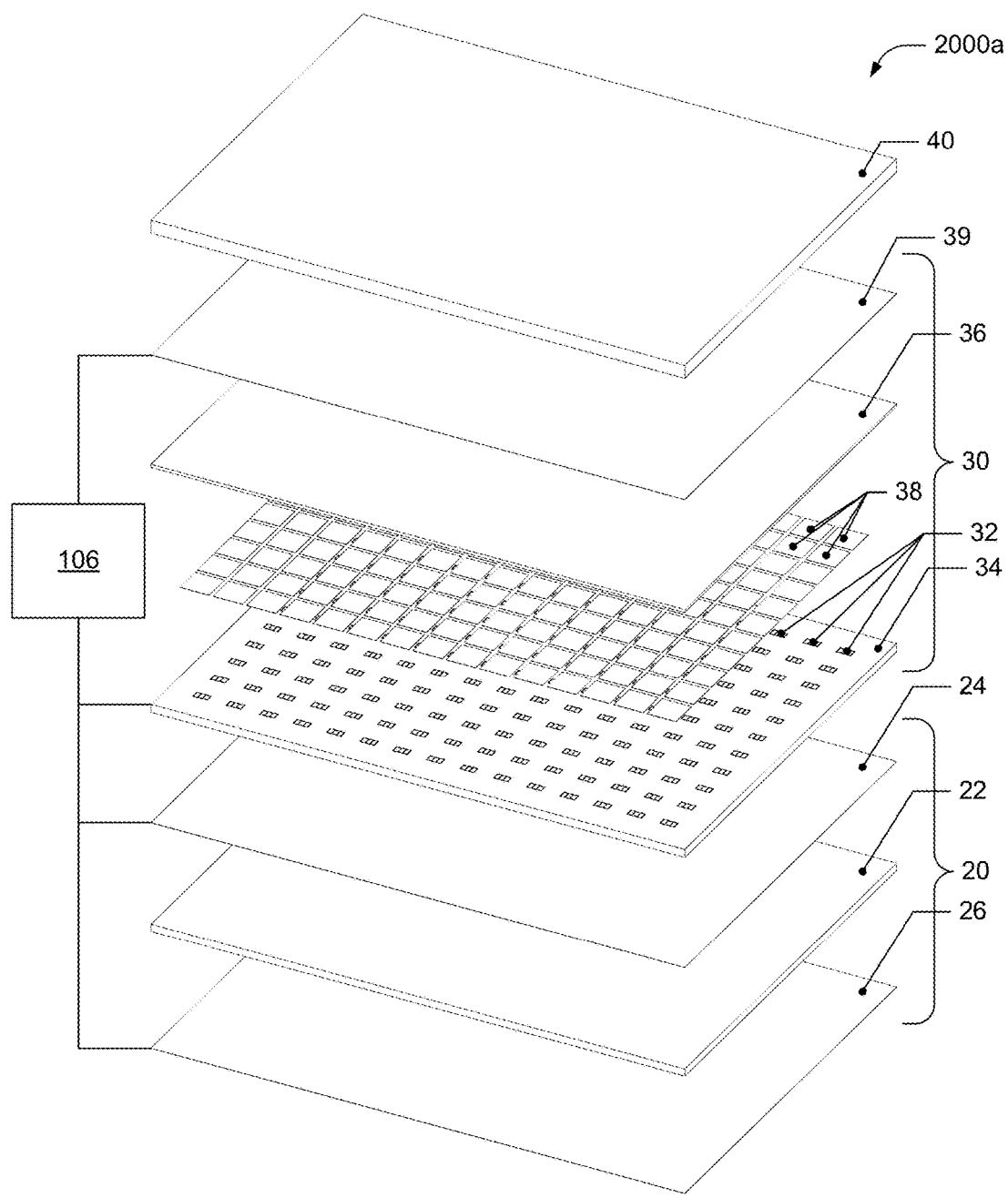
FIGS. 20A and 20B show example arrangements of ultrasonic transmitters and receivers in an ultrasonic sensor system, with other arrangements being possible.

FIG. 20A shows an example of an exploded view of an ultrasonic sensor system. In this example, the ultrasonic sensor system 2000a includes an ultrasonic transmitter 20 and an ultrasonic receiver 30 under a platen 40. According to some implementations, the ultrasonic receiver 30 may be an example of the ultrasonic sensor array 103 that is shown in FIG. 1 and described above. In some implementations, the ultrasonic transmitter 20 may be an example of the ultrasonic transmitter 105 that is shown in FIG. 1 and described above. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 106 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This generated ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may be configured to convert surface charge generated by the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be capable of processing the amplified signals received from the sensor pixel circuits 32.

The control system 106 may be capable of controlling the ultrasonic transmitter 20 and/or the ultrasonic receiver 30 to obtain ultrasonic data, which may include fingerprint data. According to some implementations, the control system 106 may be capable of providing functionality such as that described herein with reference to FIGS. 1-18.

Whether or not the ultrasonic sensor system 2000a includes a separate ultrasonic transmitter 20, in some implementations the control system 106 may be capable of obtaining attribute information from the ultrasonic data. In some examples, the control system 106 may be capable of controlling access to one or more devices based, at least in part, on the attribute information. The ultrasonic sensor system 2000a (or an associated device) may include a memory system that includes one or more memory devices. In some implementations, the control system 106 may include at least a portion of the memory system. The control system 106 may be capable of obtaining attribute information from ultrasonic data and storing the attribute information in the memory system. In some implementations, the control system 106 may be capable of capturing a fingerprint image, obtaining attribute information from the fingerprint image and storing attribute information obtained from the fingerprint image (which may be referred to herein as fingerprint image information) in the memory system. According to some examples, the control system 106 may be capable of capturing a fingerprint image, obtaining attribute information from the fingerprint image and storing attribute information obtained from the fingerprint image even while maintaining the ultrasonic transmitter 20 in an "off" state.

In some implementations, the control system 106 may be capable of operating the ultrasonic sensor system 2000a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 2000a is operating in the force-sensing mode. In some implementations, the control system 106 may be capable of controlling other devices, such as a display system, a communication system, etc. In some implementations, the control system 106 may be capable of operating the ultrasonic sensor system 2000a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 µm thick and a PVDF-TrFE receiver layer 36 is approximately 12 µm thick. Example frequencies of the ultrasonic waves may be in the range of 5 MHz to 30 MHz, with wavelengths on the order of a millimeter or less.

Figure 20B:
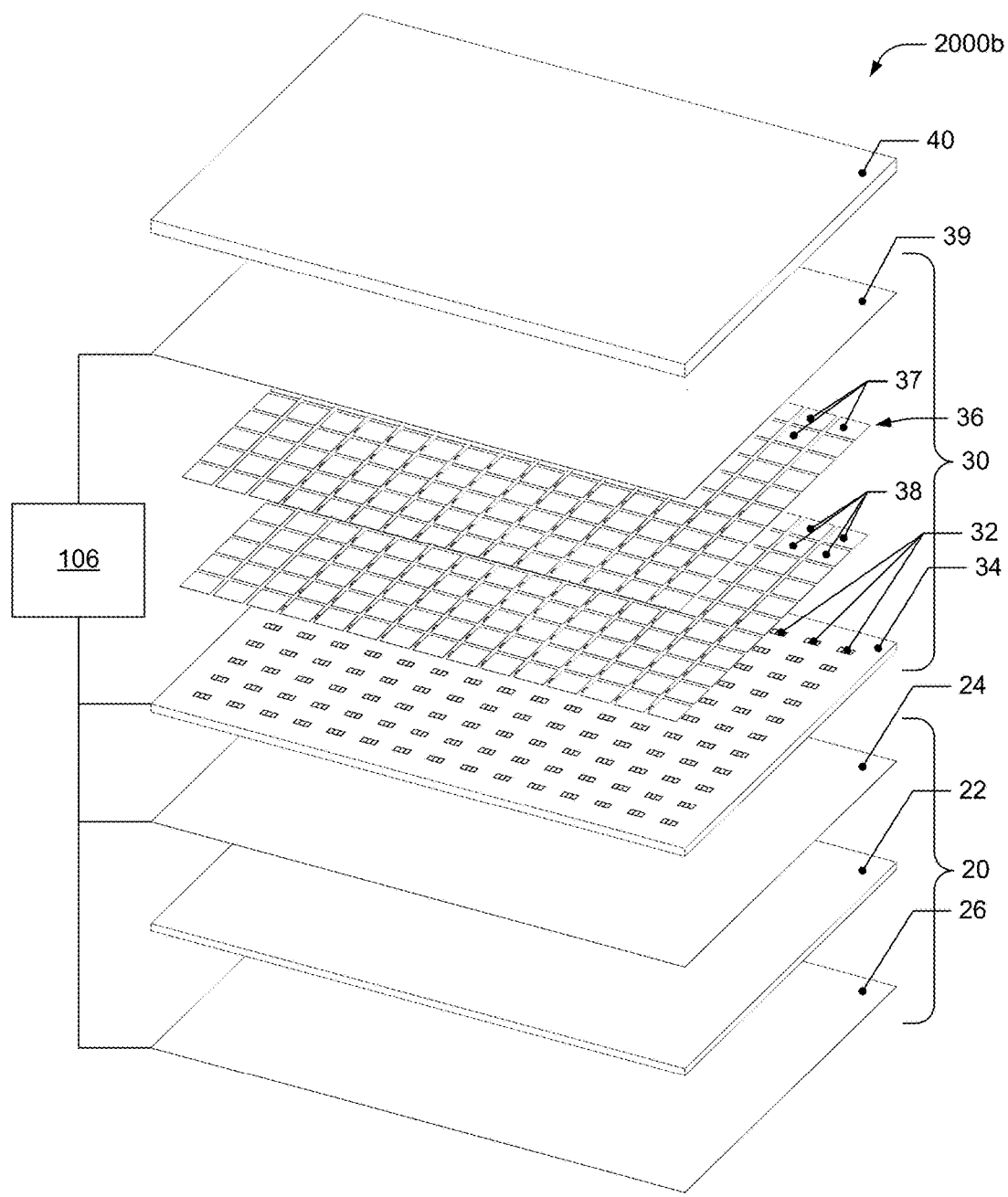

FIG. 20B shows an exploded view of an alternative example of an ultrasonic sensor system. In this example, the piezoelectric receiver layer 36 has been formed into discrete elements 37. In the implementation shown in FIG. 20B, each of the discrete elements 37 corresponds with a single pixel input electrode 38 and a single sensor pixel circuit 32. However, in alternative implementations of the ultrasonic sensor system 2000b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 20A and 20B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

Figure 20C:
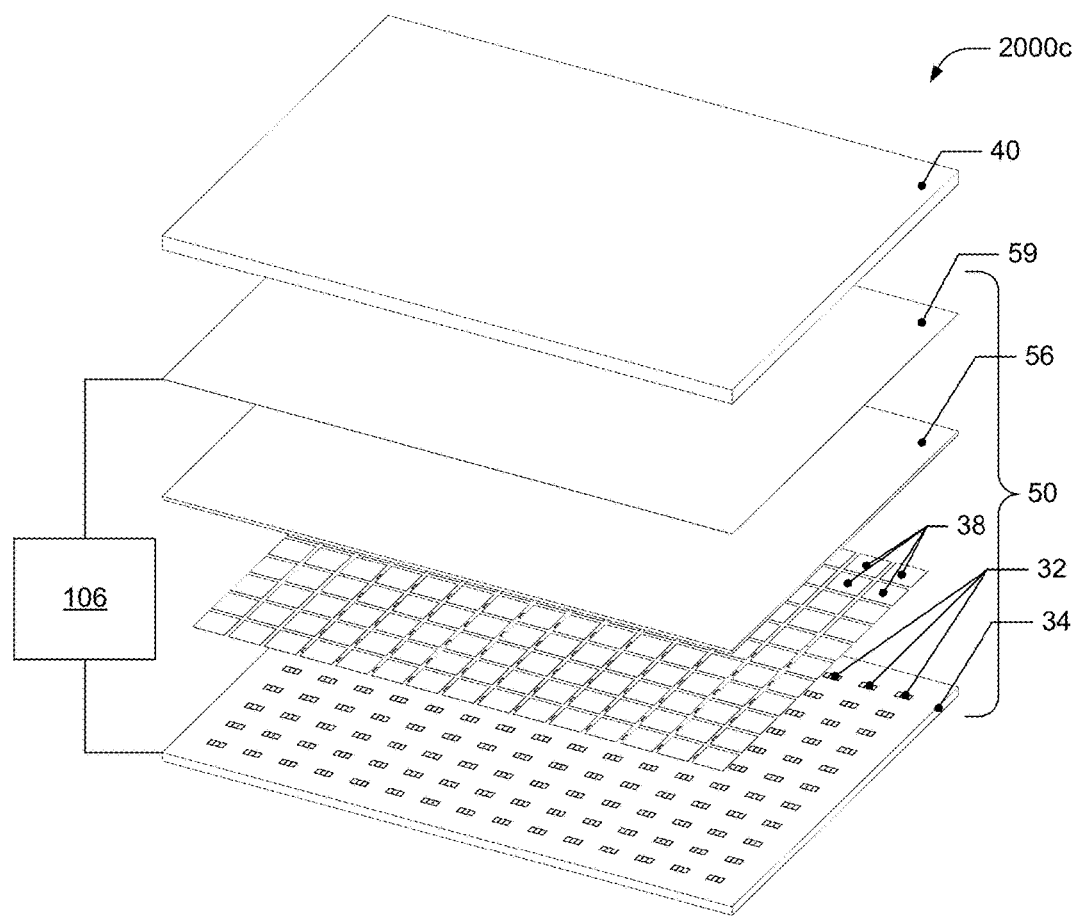
FIG. 20C shows an example of an ultrasonic transceiver array in an ultrasonic sensor system.

FIG. 20C shows an exploded view of an example of an ultrasonic sensor system. In this example, the ultrasonic sensor system 2000c includes an ultrasonic transceiver array 50 under a platen 40. According to some implementations, the ultrasonic transceiver array 50 may serve as both the ultrasonic sensor array 103 and the ultrasonic transmitter 105 that is shown in FIG. 1 and described above. The ultrasonic transceiver array 50 may include a substantially planar piezoelectric transceiver layer 56 capable of functioning as a plane wave generator. Ultrasonic waves may be generated by applying a voltage across the transceiver layer 56. The control system 106 may be capable of generating a transceiver excitation voltage that may be applied to the piezoelectric transceiver layer 56 via one or more underlying pixel input electrodes 38 or one or more overlying transceiver bias electrodes 59. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50.

The ultrasonic transceiver array 50 may include an array of sensor pixel circuits 32 disposed on a substrate 34. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may include a pixel input electrode 38 that electrically couples the piezoelectric transceiver layer 56 to the sensor pixel circuit 32.

In the illustrated implementation, the transceiver bias electrode 59 is disposed on a side of the piezoelectric transceiver layer 56 proximal to the platen 40. The transceiver bias electrode 59 may be a metallized electrode and may be grounded or biased to control which signals may be generated and which reflected signals may be passed to the array of sensor pixel circuits 32. Ultrasonic energy that is reflected from the exposed (top) surface of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) to the transceiver bias electrode 59 and the sensor pixel circuits 32 on the sensor substrate 34. In some implementations, the control system 106 may operate substantially as described above. For example, the control system 106 may be capable of processing the amplified signals received from the sensor pixel circuits 32.

The control system 106 may be capable of controlling the ultrasonic transceiver array 50 to obtain ultrasonic data, which may include fingerprint data. According to some implementations, the control system 106 may be capable of providing functionality such as that described herein, e.g., such as described herein with reference to FIGS. 1-18.

In other examples of an ultrasonic sensor system with an ultrasonic transceiver array, a backside of the sensor substrate 34 may be attached directly or indirectly to an overlying platen 40. In operation, ultrasonic waves generated by the piezoelectric transceiver layer 56 may travel through the sensor substrate 34 and the platen 40, reflect off a surface of the platen 40, and travel back through the platen 40 and the sensor substrate 34 before being detected by sensor pixel circuits 32 on or in the substrate sensor 34.

Figure 21:
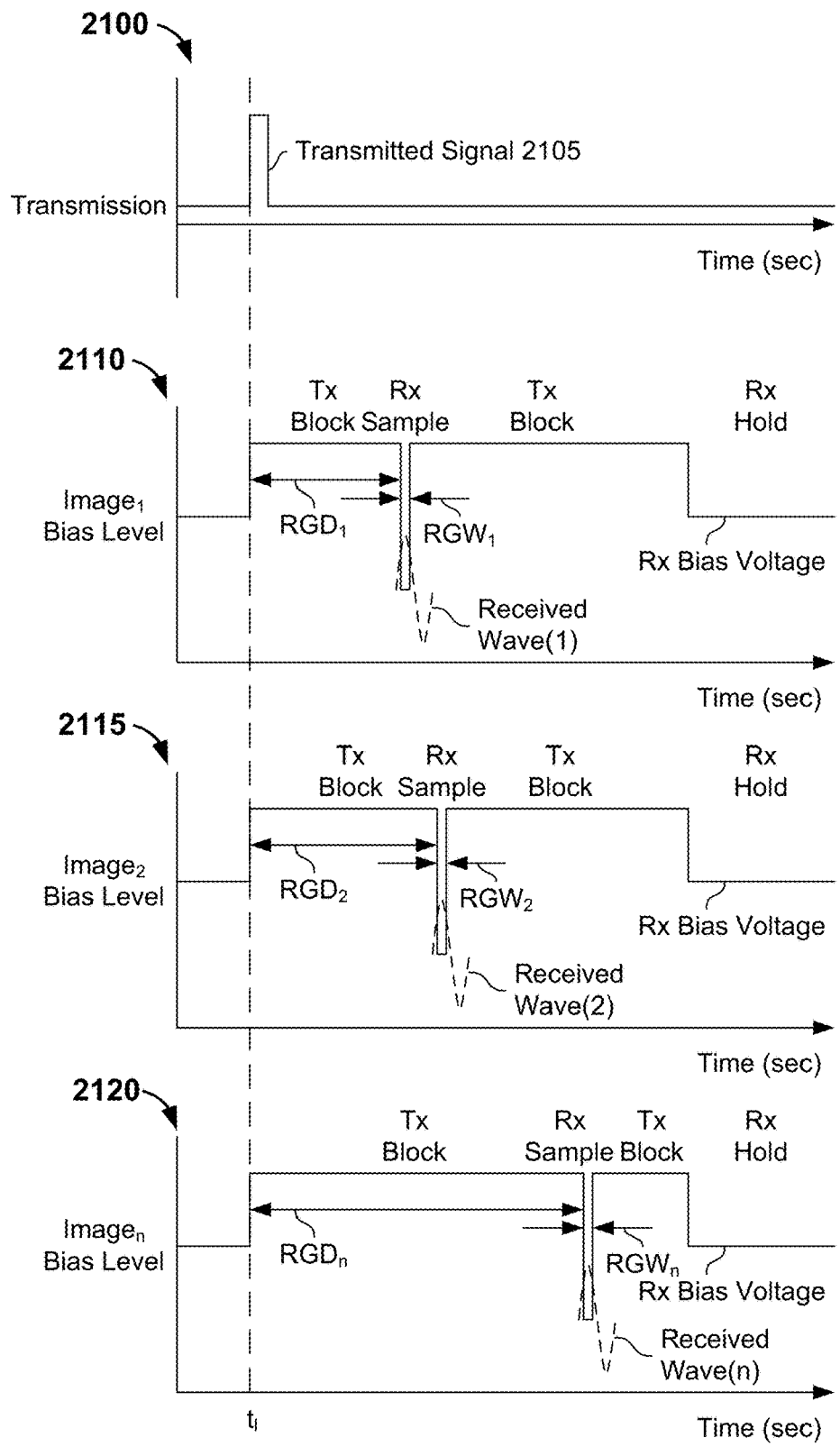
FIG. 21 shows examples of multiple acquisition time delays being selected to receive acoustic waves reflected from different depths.

FIG. 21 shows examples of multiple acquisition time delays being selected to receive acoustic waves reflected from different depths. Such examples may be advantageous for acquiring ultrasonic data for a 3-D image, e.g., for a 3-D fingerprint image. In these examples, each of the acquisition time delays (which are labeled range-gate delays or RGDs in FIG. 21) is measured from the beginning time $t_1$ of the transmitted signal 2105 shown in graph 2100. The graph 2110 depicts reflected acoustic waves (received wave (1) is one example) that may be received by an ultrasonic sensor array at an acquisition time delay $RGD_1$ and sampled during an acquisition time window of $RGW_1$. Such acoustic waves will generally be reflected from a relatively shallower portion of a target object proximate, or positioned upon, a platen of the biometric system.

Graph 2115 depicts reflected acoustic waves (received wave (2) is one example) that are received by at least a portion of the ultrasonic sensor array at an acquisition time delay $RGD_2$ (with $RGD_2 > RGD_1$) and sampled during an acquisition time window of $RGW_2$. Such acoustic waves will generally be reflected from a relatively deeper portion of the target object. Graph 2120 depicts reflected acoustic waves (received wave (n) is one example) that are received at an acquisition time delay $RGD_n$ (with $RGD_n > RGD_2 > RGD_1$) and sampled during an acquisition time window of $RGW_n$. Such acoustic waves will generally be reflected from a still deeper portion of the target object.

Range-gate delays are typically integer multiples of a clock period. A clock frequency of 128 MHz, for example, has a clock period of 7.8125 nanoseconds, and RGDs may range from under 10 nanoseconds to over 20,000 nanoseconds.

Similarly, the range-gate windows may also be integer multiples of the clock period, but are often much shorter than the RGD (e.g. less than about 50 nanoseconds) to capture returning signals while retaining good axial resolution. In some implementations, the acquisition time window (RGW) may be between about 10 nanoseconds to about 200 nanoseconds. In some examples, the RGW may be less than 10 nanoseconds, e.g., 5 nanoseconds, 6 nanoseconds, 7 nanoseconds or 8 nanoseconds. Such implementations may be advantageous for acquiring ultrasonic data for a 3-D image, e.g., for a 3-D fingerprint image. However, in some examples the RGW may be more than 200 nanoseconds.

Extending the duration of the range-gate width while keeping the RGD constant allows the sensor pixel circuits to capture the peak value of the reflected ultrasonic waves corresponding to the fingerprint ridges and valleys and to sub-epidermal features that may be captured during the time that the RGW is active. Increasing the RGD allows imaging of sub-epidermal features deeper into the finger.

Note that while various image bias levels (e.g. Tx block, Rx sample and Rx hold that may be applied to an Rx bias electrode) may be in the single or low double-digit volt range, the return signals may have voltages in the tens or hundreds of millivolts. In some implementations, the receiver bias control signal having two or more levels representing the selected RGD and RGW may be applied to the receiver bias electrode of the ultrasonic sensor array. In some implementations, a diode bias control signal applied to the sensor pixel circuits within the ultrasonic sensor array may contain two or more levels representing the selected RGD and RGW. In some implementations, a portion of the sensor pixel circuits, such as a block, line or sub-array of pixels, may be used to acquire one or more images in a sub-surface region of the target object at the desired depth and position to increase the frame rate and reduce the image processing requirements.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
an ultrasonic sensor system;
a platen;
a set of bioimpedance electrodes proximate the platen; and
a control system comprising one or more processors, the control system being configured for communication with the ultrasonic sensor system and the set of bioimpedance electrodes, the control system further configured for:
controlling the ultrasonic sensor system to transmit ultrasonic waves;
receiving ultrasonic sensor signals from the ultrasonic sensor system corresponding to ultrasonic waves reflected from a portion of a body in contact with the platen, wherein the portion of the body comprises a finger;
receiving bioimpedance measurements from the set of bioimpedance electrodes;
determining a liveness indicator based, at least in part, on the bioimpedance measurements; and
performing an authentication process based, at least in part, on the ultrasonic sensor signals and the liveness indicator, wherein the authentication process involves:
determining current fingerprint data based on the ultrasonic sensor signals;
modifying the current fingerprint data according to the bioimpedance measurements, to produce modified current fingerprint data; and
comparing the modified current fingerprint data with stored fingerprint data of an enrolled user.

2. The apparatus of claim 1, wherein the control system is configured for determining changes in at least one of capacitance or resistance of the portion of the body according to changes of the bioimpedance measurements.

3. The apparatus of claim 1, wherein the one or more biometric indicators include at least one biometric indicator selected from a list of biometric indicators consisting of skin hydration level, skin oiliness level, skin dryness and skin elasticity.

4. The apparatus of claim 1, wherein the control system is configured to modify one or more of the bioimpedance measurements according to the ultrasonic sensor signals.

5. The apparatus of claim 1, wherein the bioimpedance electrodes include capacitive sense electrodes.

6. The apparatus of claim 5, wherein the capacitive sense electrodes include interdigitated capacitive sense electrodes.

7. The apparatus of claim 5, wherein the control system is configured for:
activating a first subset of the capacitive sense electrodes with one or more sensor excitation frequencies; and
receiving an electrical response from a second subset of the capacitive sense electrodes.

8. The apparatus of claim 7, wherein the electrical response includes an output signal amplitude, a phase delay, or both an output signal amplitude and a phase delay.

9. The apparatus of claim 7, wherein the control system is further configured for estimating a status of one or more biometric indicators of the portion of the body based on the ultrasonic sensor signals and the bioimpedance measurements, wherein estimating the status of the one or more biometric indicators involves determining an effective dielectric permittivity of the portion of the body and comparing the effective dielectric permittivity with a reference dielectric permittivity.

10. The apparatus of claim 7, wherein the control system is configured for:
activating the first subset of the capacitive sense electrodes with a plurality of sensor excitation frequencies;
determining a plurality of effective dielectric permittivities of the portion of the body, each of the plurality of effective dielectric permittivities corresponding to a sensor excitation frequency of the plurality of sensor excitation frequencies; and
comparing the effective dielectric permittivities with reference dielectric permittivities.

11. The apparatus of claim 1, wherein the control system is configured for:
calculating, based on the ultrasonic sensor signals, one or more acoustic impedance values for the portion of the body; and
estimating a status of the one or more biometric indicators based on the one or more acoustic impedance values and the bioimpedance measurements.

12. The apparatus of claim 11, wherein the control system is configured for:
calculating a composite measurement based on the one or more acoustic impedance values and the bioimpedance measurements; and
determining a skin condition of the portion of the body based, at least in part, on the composite measurement.

13. The apparatus of claim 1, further comprising a substrate, wherein the set of bioimpedance electrodes and ultrasonic sensors of the ultrasonic sensor system reside on the substrate.

14. The apparatus of claim 1, wherein the control system is configured for:
determining, based on the ultrasonic sensor signals, a fingerprint contact area, and
estimating a status of one or more biometric indicators of the portion of the body based on the ultrasonic sensor signals and the bioimpedance measurements, wherein estimating the status of one or more biometric indicators is based, at least in part, on the fingerprint contact area.

15. The apparatus of claim 14, wherein the apparatus includes a user interface system and wherein the control system is configured to provide feedback, via the user interface system, regarding the fingerprint contact area.

16. The apparatus of claim 1, wherein the authentication process is also based on a biometric indicator and wherein the control system is configured for generating the biometric indicator from the bioimpedance measurements.

17. The apparatus of claim 16, wherein the authentication process involves one or more of determining whether the biometric indicator upon which the authentication process is based, in part, is above a predetermined lower biometric threshold, determining whether the biometric indicator is below a predetermined upper biometric threshold, or determining whether the biometric indicator is within a predetermined biometric range.

18. The apparatus of claim 1, wherein modifying the current fingerprint data involves one or more corrections selected from a list of corrections consisting of a ridge-flow correction, a dry-finger correction, a wet-finger correction and an oily-finger correction.

19. The apparatus of claim 1, wherein the authentication process involves:
    determining current fingerprint data based on the ultrasonic sensor signals;
    adjusting a fingerprint matching process according to the bioimpedance measurements; and
    comparing, according to the adjusted fingerprint matching process, the current fingerprint data with stored fingerprint data of an enrolled user.

20. The apparatus of claim 1, wherein the control system is configured for:
    controlling the ultrasonic sensor system to obtain three-dimensional image data;
    extracting acoustic information from the bioimpedance measurements; and
    modifying the three-dimensional image data according to the acoustic information.

21. A method, comprising:
    controlling an ultrasonic sensor system to transmit ultrasonic waves;
    receiving ultrasonic sensor signals from the ultrasonic sensor system corresponding to ultrasonic waves reflected from a portion of a body in contact with the platen, wherein the portion of the body comprises a finger;
    receiving bioimpedance measurements from the set of bioimpedance electrodes;
    determining a liveness indicator based, at least in part, on the bioimpedance measurements; and
    performing an authentication process based, at least in part, on the ultrasonic sensor signals and the liveness indicator, wherein the authentication process involves:
        determining current fingerprint data based on the ultrasonic sensor signals;
        modifying the current fingerprint data according to the bioimpedance measurements, to produce modified current fingerprint data; and
        comparing the modified current fingerprint data with stored fingerprint data of an enrolled user.

22. The method of claim 21, further comprising estimating a status of one or more biometric indicators of the portion of the body based on the ultrasonic sensor signals and the bioimpedance measurements, wherein the one or more biometric indicators include at least one biometric indicator selected from a list of biometric indicators consisting of skin hydration level, skin oiliness level, skin dryness and skin elasticity.

23. The method of claim 21, wherein the bioimpedance electrodes include capacitive sense electrodes and wherein the method further comprises:
    activating a first subset of the capacitive sense electrodes with one or more sensor excitation frequencies; and
    receiving an electrical response from a second subset of the capacitive sense electrodes.

24. A non-transitory medium having software stored thereon, the software including instructions for:
    controlling an ultrasonic sensor system to transmit ultrasonic waves;
    receiving ultrasonic sensor signals from the ultrasonic sensor system corresponding to ultrasonic waves reflected from a portion of a body;
    receiving bioimpedance measurements from a set of bioimpedance electrodes;
    controlling the ultrasonic sensor system to obtain three-dimensional image data;
    extracting acoustic information from the bioimpedance measurements; and
    modifying the three-dimensional image data according to the acoustic information.

25. The non-transitory medium of claim 24, wherein the software includes instructions for:
    determining a liveness indicator based, at least in part, on the bioimpedance measurements; and
    performing an authentication process based, at least in part, on the ultrasonic sensor signals and the liveness indicator.

26. An apparatus, comprising:
    an ultrasonic sensor system;
    a platen;
    a set of bioimpedance electrodes proximate the platen; and
    control means configured for communication with the ultrasonic sensor system and the set of bioimpedance electrodes, the control means comprising means for:
        controlling the ultrasonic sensor system to transmit ultrasonic waves;
        receiving bioimpedance measurements from a set of bioimpedance electrodes;
        controlling the ultrasonic sensor system to obtain three-dimensional image data;
        extracting acoustic information from the bioimpedance measurements; and
        modifying the three-dimensional image data according to the acoustic information.

27. The apparatus of claim 26, wherein the control means includes means for determining changes in at least one of capacitance or resistance of the portion of the body according to changes of the bioimpedance measurements.

* * * * *